United States Patent
Miyazaki et al.

(10) Patent No.: US 10,106,220 B2
(45) Date of Patent: Oct. 23, 2018

(54) BICYCLE OPERATING DEVICE

(71) Applicant: SHIMANO INC., Sakai (JP)

(72) Inventors: Kentaro Miyazaki, Sakai (JP); Kazutaka Fukao, Sakai (JP); Yasuhisa Watanabe, Sakai (JP)

(73) Assignee: SHIMANO INC., Sakai (JP)

( * ) Notice: Subject to any disclaimer, the term of this patent is extended or adjusted under 35 U.S.C. 154(b) by 155 days.

(21) Appl. No.: 14/820,496

(22) Filed: Aug. 6, 2015

(65) Prior Publication Data

US 2017/0037894 A1 Feb. 9, 2017

(51) Int. Cl.
*B62K 23/06* (2006.01)
*F16C 1/18* (2006.01)
*F16C 1/22* (2006.01)

(52) U.S. Cl.
CPC ............... *B62K 23/06* (2013.01); *F16C 1/18* (2013.01); *F16C 1/223* (2013.01)

(58) Field of Classification Search
CPC ....... B62M 25/04; B62M 25/045; B62L 3/02; B62K 23/06
See application file for complete search history.

(56) References Cited

U.S. PATENT DOCUMENTS

| 4,222,285 | A | * | 9/1980 | Kine | B62L 3/02 74/480 R |
|---|---|---|---|---|---|
| 4,318,307 | A | * | 3/1982 | Kine | B62L 3/02 74/489 |
| 4,611,500 | A | * | 9/1986 | Nagano | B62L 3/02 74/489 |
| 4,974,469 | A | * | 12/1990 | Romano | B62K 23/06 74/489 |
| 2006/0053940 | A1 | | 3/2006 | McLaughlin et al. | |

FOREIGN PATENT DOCUMENTS

| JP | 63-312291 | 12/1988 |
|---|---|---|
| JP | 63-315390 | 12/1988 |

* cited by examiner

*Primary Examiner* — Thomas C Diaz
(74) *Attorney, Agent, or Firm* — Mori & Ward, LLP

(57) ABSTRACT

A bicycle operating device comprises a base member, a cable control body, an operating member, a supporting structure, and an adjusting structure. The cable control body is configured to be pivotably mounted to the base member about a pivot axis to control a control cable. The operating member is configured to be movably mounted to the base member from a rest position to an operated position to move the cable control body. The supporting structure is configured to pivotably support the cable control body relative to the base member. The supporting structure is provided to the base member so as to at least partly intersect with the pivot axis. The adjusting structure is configured to adjustably position the supporting structure relative to the base member such that the rest position of the operating member is adjusted relative to the base member.

30 Claims, 18 Drawing Sheets

BICYCLE OPERATING DEVICE

BACKGROUND OF THE INVENTION

Field of the Invention

The present invention relates to a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle operating device (see, e.g., Japanese Unexamined Patent Application Publications No. S63-312291 and No. S63-315390).

SUMMARY OF THE INVENTION

In accordance with a first aspect of the present invention, a bicycle operating device comprises a base member, a cable control body, an operating member, a supporting structure, and an adjusting structure. The base member is configured to be mounted to a bicycle body. The cable control body is configured to be pivotably mounted to the base member about a pivot axis to control a control cable. The operating member is configured to be movably mounted to the base member from a rest position to an operated position to move the cable control body. The supporting structure is configured to pivotably support the cable control body relative to the base member. The supporting structure is provided to the base member so as to at least partly intersect with the pivot axis. The adjusting structure is configured to adjustably position the supporting structure relative to the base member such that the rest position of the operating member is adjusted relative to the base member.

With the bicycle operating device according to the first aspect, it is possible to adjust the rest position of the operating member relative to the base member by using the adjusting structure.

In accordance with a second aspect of the present invention, the bicycle operating device according to the first aspect is configured so that the cable control body is configured to be non-movably coupled to the operating member.

With the bicycle operating device according to the second aspect, it is possible to operate the cable control body via the operating member even when the adjusting structure is broken.

In accordance with a third aspect of the present invention, the bicycle operating device according to the second aspect is configured so that the cable control body is integrally provided with the operating member as a single unitary member.

With the bicycle operating device according to the third aspect, it is possible to simplify the structure of the operating member and the cable control body.

In accordance with a fourth aspect of the present invention, the bicycle operating device according to any one of the first to third aspects is configured so that the adjusting structure is configured to adjustably position the supporting structure relative to the base member about the pivot axis.

In accordance with a fifth aspect of the present invention, the bicycle operating device according to the fourth aspect is configured so that the adjusting structure is configured to adjustably position the supporting structure relative to the base member about the pivot axis such that the rest position of the operating member is continuously adjusted relative to the base member.

With the bicycle operating device according to the fifth aspect, it is possible to easily provide the fine adjustment of the rest position by using the adjusting structure.

In accordance with a sixth aspect of the present invention, the bicycle operating device according to the fourth or fifth aspect is configured so that the cable control body is pivotable together with the operating member relative to the base member about the pivot axis from the rest position to the operated position. The adjusting structure is configured to position the supporting structure relative to the base member about the pivot axis such that the cable control body is movable relative to the base member from the rest position to the operated position.

In accordance with a seventh aspect of the present invention, the bicycle operating device according to any one of the fourth to sixth aspects is configured so that the adjusting structure is configured to adjustably position the supporting structure relative to the base member about the pivot axis within an adjustable range. The adjusting structure includes a restricting member contactable with the supporting structure to define the adjustable range.

With the bicycle operating device according to the seventh aspect, it is possible to mechanically define the adjustable range, allowing the user to recognize the adjustable range.

In accordance with an eighth aspect of the present invention, the bicycle operating device according to the seventh aspect is configured so that the supporting structure includes a pivot shaft and a support member. The pivot shaft is movably coupled to the cable control body such that the cable control body is pivotable relative to the pivot shaft about the pivot axis. The support member is non-rotatably coupled to the pivot shaft. The support member includes a first contact part and a second contact part. The first contact part is contactable with the restricting member. The second contact part is contactable with the restricting member.

In accordance with a ninth aspect of the present invention, the bicycle operating device according to the seventh or eighth aspect is configured so that the restricting member is secured to the base member.

In accordance with a tenth aspect of the present invention, the bicycle operating device according to any one of the sixth to ninth aspects is configured so that the supporting structure includes a pivot shaft movably coupled to the cable control body such that the cable control body is pivotable relative to the pivot shaft about the pivot axis. The adjusting structure includes a clamping structure configured to adjustably position the pivot shaft such that a circumferential position of the cable control body is adjusted relative to the base member about the pivot axis.

With the bicycle operating device according to the tenth aspect, it is possible to adjust the rest position of the operating member with a simple structure including the pivot shaft and the clamping structure.

In accordance with an eleventh aspect of the present invention, the bicycle operating device according to the tenth aspect is configured so that the clamping structure includes a clamping member and a fastener. The clamping member is configured to be attached to the base member and configured to be in each of an adjustable state in which the pivot shaft is rotatable relative to the base member about the pivot axis, and a securing state in which the pivot shaft is secured to the base member via the clamping member. The fastener is configured to change a state of the clamping member between the adjustable state and the securing state.

With the bicycle operating device according to the eleventh aspect, it is possible to easily change the state of the clamping member between the adjustable state and the securing state, making it easier to adjust the rest position of the operating member.

In accordance with a twelfth aspect of the present invention, the bicycle operating device according to the eleventh aspect is configured so that the base member includes a housing in which each of the cable control body and the adjusting structure is at least partly provided. The fastener is accessible from outside of the housing.

With the bicycle operating device according to the twelfth aspect, it is possible to easily adjust the rest position of the operating member via the fastener from outside of the housing.

In accordance with a thirteenth aspect of the present invention, the bicycle operating device according to the eleventh or twelfth aspect is configured so that the pivot shaft includes an outer peripheral surface and an outer groove provided on the outer peripheral surface, the outer groove extending about the pivot axis. The fastener extends through the outer groove to prevent the pivot shaft from being removed from the clamping member.

In accordance with a fourteenth aspect of the present invention, the bicycle operating device according to any one of the sixth to eighth aspects is configured so that the supporting structure includes a pivot shaft and a support member. The pivot shaft is movably coupled to the cable control body such that the cable control body is pivotable relative to the pivot shaft about the pivot axis. The support member is non-rotatably coupled to the pivot shaft. The adjusting structure is configured to adjustably position the support member relative to the base member such that the rest position of the cable control body is adjusted relative to the base member.

In accordance with a fifteenth aspect of the present invention, the bicycle operating device according to the fourteenth aspect is configured so that the adjusting structure includes a restricting member and an adjusting member. The restricting member is configured to be coupled to the support member. The restricting member includes a threaded hole. The adjusting member includes a thread bolt engaged with the threaded hole. The adjusting member is configured to be rotatably mounted to the base member about a center axis. The threaded hole and the thread bolt are configured to convert a rotation of the adjusting member to a pivotal movement of the support member relative to the base member about the pivot axis.

With the bicycle operating device according to the fifteenth aspect, it is possible to easily adjust the rest position of the operating member by using the restricting member and the adjusting member.

In accordance with a sixteenth aspect of the present invention, the bicycle operating device according to the fifteenth aspect is configured so that the base member is configured to restrict an axial movement of the adjusting member along the center axis relative to the base member.

In accordance with a seventeenth aspect of the present invention, the bicycle operating device according to the fifteenth or sixteenth aspect is configured so that the base member includes a housing in which each of the cable control body and the adjusting structure is at least partly provided. The adjusting member is accessible from outside of the housing.

With the bicycle operating device according to the seventeenth aspect, it is possible to easily adjust the rest position of the operating member via the adjusting member from outside of the housing.

In accordance with an eighteenth aspect of the present invention, the bicycle operating device according to any one of the fifteenth to seventeenth aspects is configured so that the restricting member is pivotable relative to the support member about an additional pivot axis.

In accordance with a nineteenth aspect of the present invention, the bicycle operating device according to the eighteenth aspect is configured so that the support member is configured to be adjustably positioned relative to the base member such that the rest position of the cable control body is adjusted relative to the base member within an adjustable range. The restricting member is pivotable relative to the support member about the additional pivot axis within a pivotable range to define the adjustable range.

With the bicycle operating device according to the nineteenth aspect, it is possible to mechanically define the adjustable range via the restricting member and the support member, allowing the user to recognize the adjustable range.

In accordance with a twentieth aspect of the present invention, the bicycle operating device according to any one of the first to nineteenth aspects further comprises an additional cable control body and an additional operating member. The additional cable control body is separately provided from the cable control body. The additional cable control body is movable relative to the base member to control an additional control cable separately provided from the control cable. The additional operating member is movable relative to the base member to move the additional cable control body relative to the base member. The adjusting structure is configured to adjustably position the supporting structure relative to the base member without changing the position of the additional cable control body and the additional operating member relative to the base member.

With the bicycle operating device according to the twentieth aspect, it is possible to operate an additional bicycle component by using the additional cable control body and the additional operating member in addition to the bicycle component.

In accordance with a twenty-first aspect of the present invention, the bicycle operating device according to any one of the first to twentieth aspects is configured so that the supporting structure is movably mounted to the base member. The supporting structure is configured to position the cable control body relative to the base member to position the operating member at the rest position relative to the base member.

In accordance with a twenty-second aspect of the present invention, the bicycle operating device according to the twenty-first aspect is configured so that the supporting structure is pivotably mounted to the base member about the pivot axis.

In accordance with a twenty-third aspect of the present invention, the bicycle operating device according to the twenty-first or twenty-second aspect is configured so that the base member includes a housing in which the supporting structure is at least partly provided. The supporting structure is movably mounted to the housing.

In accordance with a twenty-fourth aspect of the present invention, a bicycle operating device comprises a base member, a cable control body, an operating member, and an adjusting structure. The base member is configured to be mounted to a bicycle body. The base member includes a housing. The cable control body is configured to be pivotably mounted to the base member about a pivot axis to control a control cable. The operating member is configured to be movably mounted to the base member from a rest position to an operated position to move the cable control body. The adjusting structure is configured to adjustably position the cable control body relative to the base member such that the rest position of the operating member is adjusted relative to the base member. Each of the cable control body and the adjusting structure being at least partly provided in the housing.

With the bicycle operating device according to the twenty-fourth aspect, it is possible to simplify the appearance of the bicycle operating device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
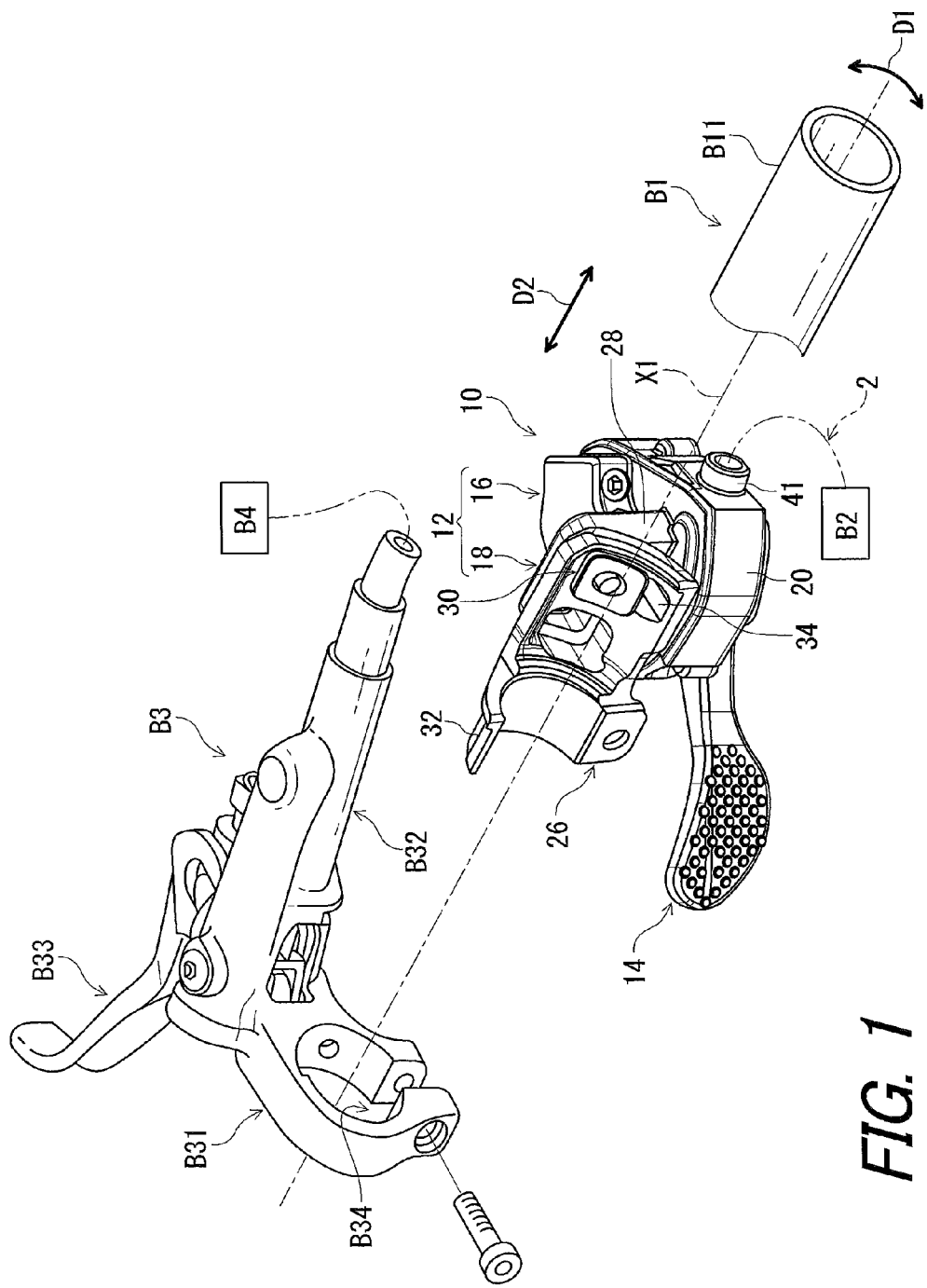
FIG. 1 is a perspective view of a bicycle operating device in accordance with a first embodiment with a bicycle brake operating device and a bicycle body.

The embodiments will now be described with reference to the accompanying drawings, wherein like reference numerals designate corresponding or identical elements throughout the various drawings.

First Embodiment

Referring initially to FIG. 1, a bicycle operating device 10 in accordance with a first embodiment is configured to be mounted to a bicycle body B1. Examples of the bicycle body B1 include a bicycle tube member B11 such as a bicycle handlebar. The bicycle operating device 10 is configured to operate a bicycle component B2 configured to be operated via a control cable 2 such as a Bowden cable. The bicycle component B2 can be a cable-operated device. Examples of the bicycle component B2 include an adjustable seatpost assembly, a bicycle transmission, a suspension, and an intermediate take-up device. For example, the intermediate take-up device is operatively connected to the bicycle operating device 10 via the control cable 2. The intermediate take-up device is configured to wind and unwind another control cable to operate a cable-operated device in response to movement of the control cable 2.

The bicycle operating device 10 is a left hand side control device operated by the rider's left hand. It will be apparent to those skilled in the bicycle field that the configuration of the bicycle operating device 10 can be adapted to a right hand side control device that is operated by the rider's right hand.

In the present application, the following directional terms "forward", "rearward", "left", "right", "upward" and "downward" as well as any other similar directional terms refer to those directions which are determined on the basis of the rider who sits on a bicycle seat (not shown) of a bicycle with facing the bicycle handlebar. Accordingly, these terms, as utilized to describe the bicycle operating device 10, should be interpreted relative to a bicycle equipped with the bicycle operating device 10 as used in an upright riding position on a horizontal surface.

As seen in FIG. 1, the bicycle operating device 10 comprises a base member 12 and an operating member 14. The base member 12 is configured to be mounted to the bicycle body B1. The operating member 14 is configured to be movably mounted to the base member 12. The base member 12 is configured to be mounted to the bicycle body B1 via a mounting clamp B31 of a bicycle brake operating device B3. A bicycle brake device B4 is actuated via the bicycle brake operating device B3. The bicycle brake operating device B3 includes a main body B32 and a brake lever B33. The main body B32 is coupled to the mounting clamp B31. The brake lever B33 is pivotably mounted to the main body B32. The bicycle brake operating device B3 includes a hydraulic operating unit (not shown) in the main body B32, for example.

The base member 12 includes a housing 16 and a mounting structure 18. The operating member 14 is configured to be movably mounted to the housing 16. The mounting structure 18 is configured to be coupled to the bicycle body B1 via the mounting clamp B31.

Figure 2:
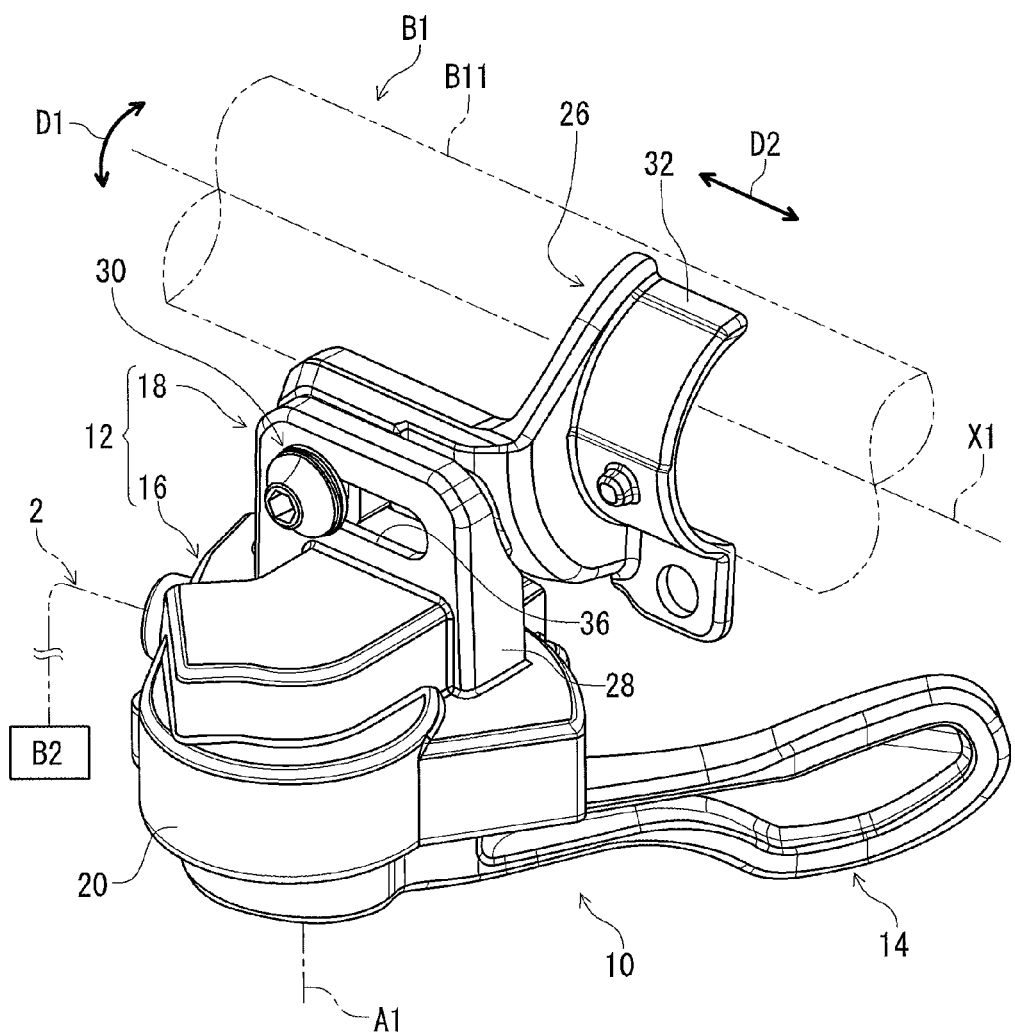
FIG. 2 is a perspective view of the bicycle operating device.
Figure 3:
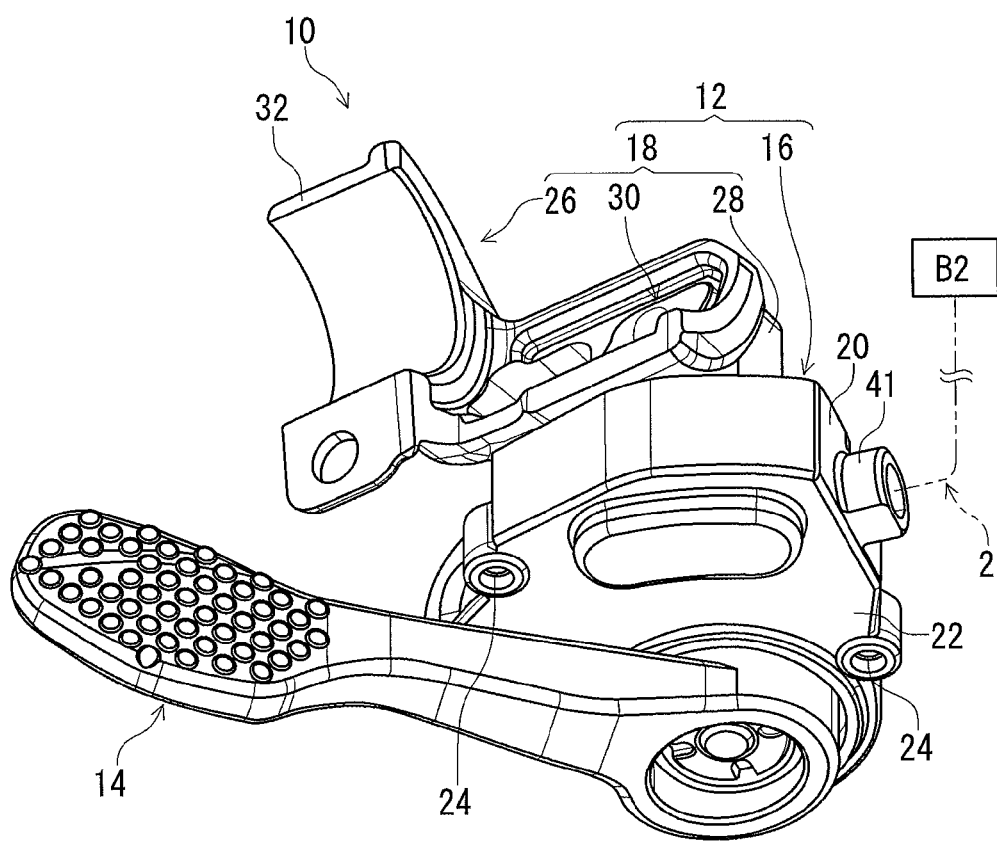
FIG. 3 is a perspective view of the bicycle operating device.

As seen in FIGS. 2 and 3, the housing 16 includes a first housing member 20 and a second housing member 22. The first housing member 20 is provided above the second housing member 22 in a mounting state where the bicycle operating device 10 is mounted to the bicycle body B1. The second housing member 22 is secured to the first housing member 20 via screws 24 (FIG. 3).

As seen in FIG. 1, the mounting structure 18 includes an adapter member 26, a receiving member 28, and a coupling member 30. The adapter member 26 is configured to be attached to the mounting clamp B31. The mounting clamp B31 includes a clamp hole B34 through which the bicycle body B1 is to extend. The adapter member 26 has a connecting portion 32 configured to be detachably disposed within the clamp hole B34. The mounting clamp B31 and the connecting portion 32 define a cylinder portion through which the bicycle body B1 is to extend.

The receiving member 28 is secured to the housing 16. In this embodiment, the receiving member 28 is integrally provided with the first housing member 20 as a single unitary member. The adapter member 26 is configured to be movably coupled to the receiving member 28 via the coupling member 30.

As seen in FIG. 1, the adapter member 26 includes a first elongated hole 34 extending in a first direction D1. In this embodiment, the first direction D1 is a circumferential direction of the connecting portion 32. The coupling member 30 extends through the first elongated hole 34.

As seen in FIG. 2, the receiving member 28 includes a second elongated hole 36 extending in a second direction D2. In this embodiment, the second direction D2 is a longitudinal direction of the bicycle body B1. Specifically, the second direction D2 is a direction parallel to a longitudinal center axis X1 of the bicycle tube member B11 of the bicycle body B1. The second direction D2 also corresponds to a center of an arc defined by the connecting portion 32. The coupling member 30 extends through the second elongated hole 36. Thus, the housing 16 is configured to be coupled to the adapter member 26 via the receiving member 28 and the coupling member 30 such that a position of the housing 16 is adjustable relative to the adapter member 26 in each of the first direction D1 and the second direction D2. The mounting structure 18 is configured to couple the housing 16 to the bicycle body B1 such that a position of the housing 16 is adjustable relative to the bicycle body B1 in each of the first direction D1 and the second direction D2.

Figure 4:
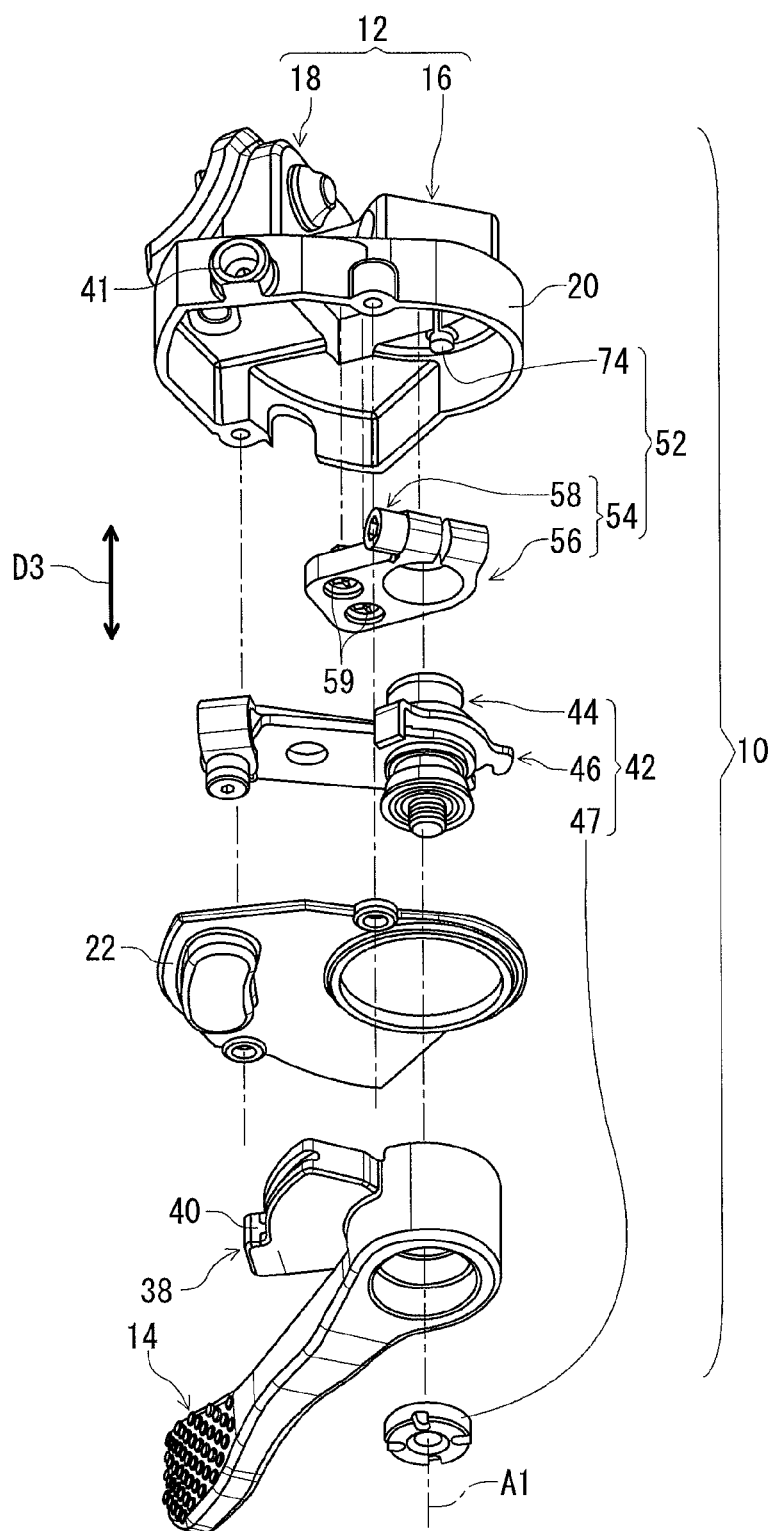
FIG. 4 is an exploded perspective view of the bicycle operating device.

As seen in FIG. 4, the bicycle operating device 10 comprises a cable control body 38. The cable control body 38 is configured to be pivotably mounted to the base member 12 about a pivot axis A1 to control the control cable 2 (FIG. 2). The cable control body 38 is configured to be non-movably coupled to the operating member 14. In this embodiment, the cable control body 38 is integrally provided with the operating member 14 as a single unitary member. However, the cable control body 38 can be a separate member from the operating member 14. The cable control body 38 can be configured to be movably coupled to the operating member 14. In a case where the cable control body 38 is a separate member from the operating member 14, the cable control body 38 is secured to the operating member 14 via adhesive and/or other suitable securing structures. The cable control body 38 and the operating member 14 include a rigid material such as a metallic material or a non-metallic material.

Figure 5:
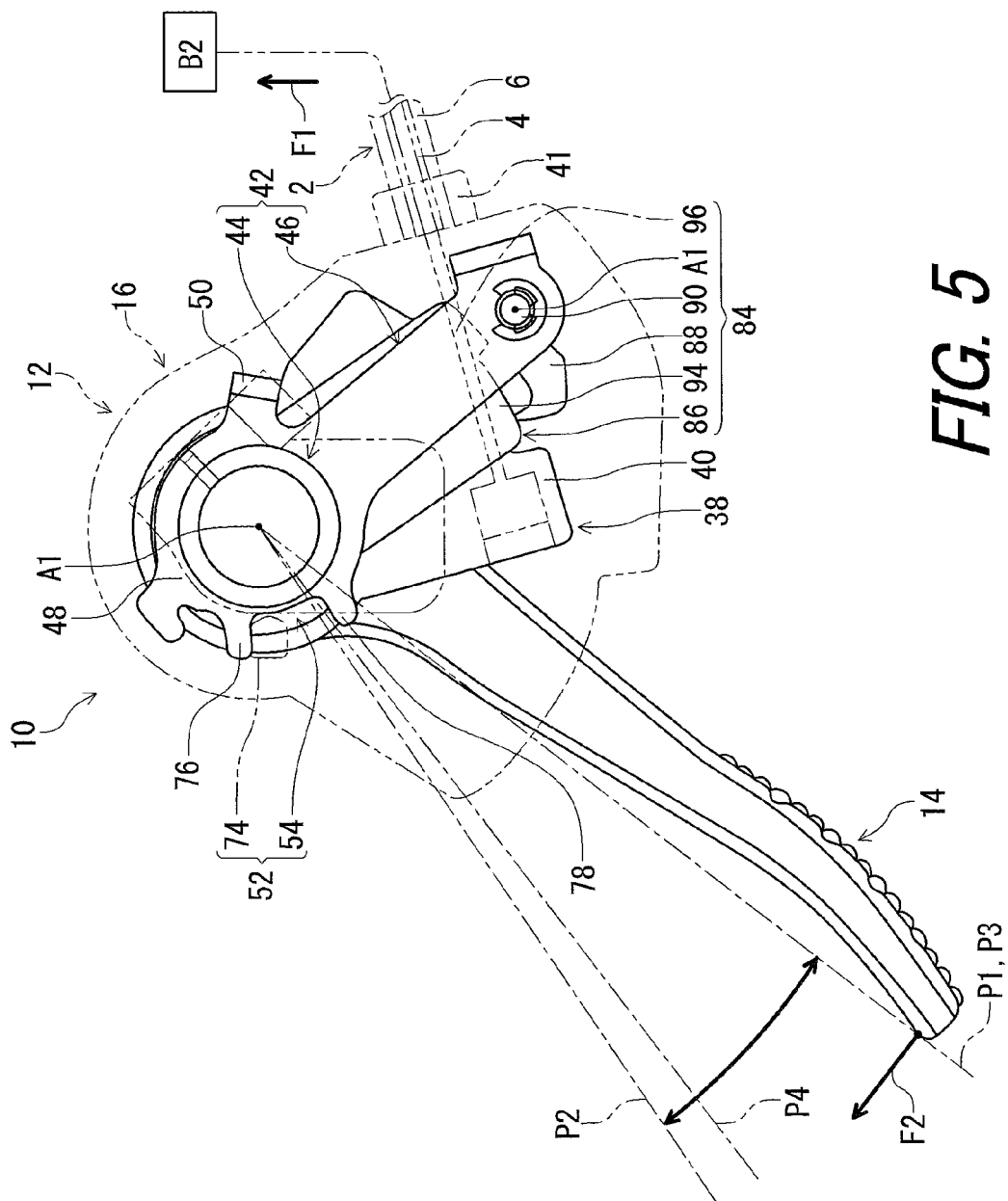
FIG. 5 is a plan view of the bicycle operating device with a base member omitted.

As seen in FIG. 5, the operating member 14 is configured to be movably mounted to the base member 12 from a rest position P1 to an operated position P2 to move the cable control body 38. The cable control body 38 is pivotable together with the operating member 14 relative to the base member 12 about the pivot axis A1 from the rest position P1 to the operated position P2. The cable control body 38 includes a cable attachment part 40 to which an inner wire 4 of the control cable 2 is attached. The housing 16 includes an outer-casing receiving part 41 configured to receive an outer casing 6 of the control cable 2. The bicycle operating device 10 includes only the operating member 14 as a single operating member configured to move the cable control body 38. However, the bicycle operating device 10 can include another operating member configured to move the cable control body 38 in addition to the operating member 14.

For example, an initial pulling force F1 is applied to the inner wire 4 between the cable control body 38 and the bicycle component B2. An operating force F2 is applied to the operating member 14 from the user to pivot the operating member 14 from the rest position P1 toward the operated position P2. The inner wire 4 is pulled relative to the outer casing 6 against the initial pulling force F1 when the cable control body 38 is pivoted relative to the base member 12 about the pivot axis A1 from the rest position P1 to the operated position P2 by the operating force F2. The inner wire 4 is returned by the initial pulling force F1 when the cable control body 38 is pivoted relative to the base member 12 about the pivot axis A1 from the operated position P2 to the rest position P1 by releasing or reducing the operating force F2. The bicycle operating device 10 can include a biasing member configured to bias the operating member 14 and/or the cable control body 38 toward the rest position P1.

As seen in FIG. 4, the bicycle operating device 10 comprises a supporting structure 42. The supporting structure 42 is configured to pivotably support the cable control body 38 relative to the base member 12. As seen in FIG. 5, the supporting structure 42 is configured to position the cable control body 38 relative to the base member 12 to position the operating member 14 at the rest position P1 relative to the base member 12. Specifically, the supporting structure 42 is configured to position the cable control body 38 relative to the housing 16 to position the operating member 14 at the rest position P1 relative to the housing 16.

As seen in FIG. 4, the supporting structure 42 is provided to the base member 12 so as to at least partly intersect with the pivot axis A1. The pivot axis A1 extends through the supporting structure 42. The supporting structure 42 is movably mounted to the base member 12. The supporting structure 42 is movably mounted to the housing 16. In this embodiment, the supporting structure 42 is pivotably mounted to the base member 12 about the pivot axis A1. The supporting structure 42 is pivotably mounted to the housing 16 about the pivot axis A1.

Figure 6:
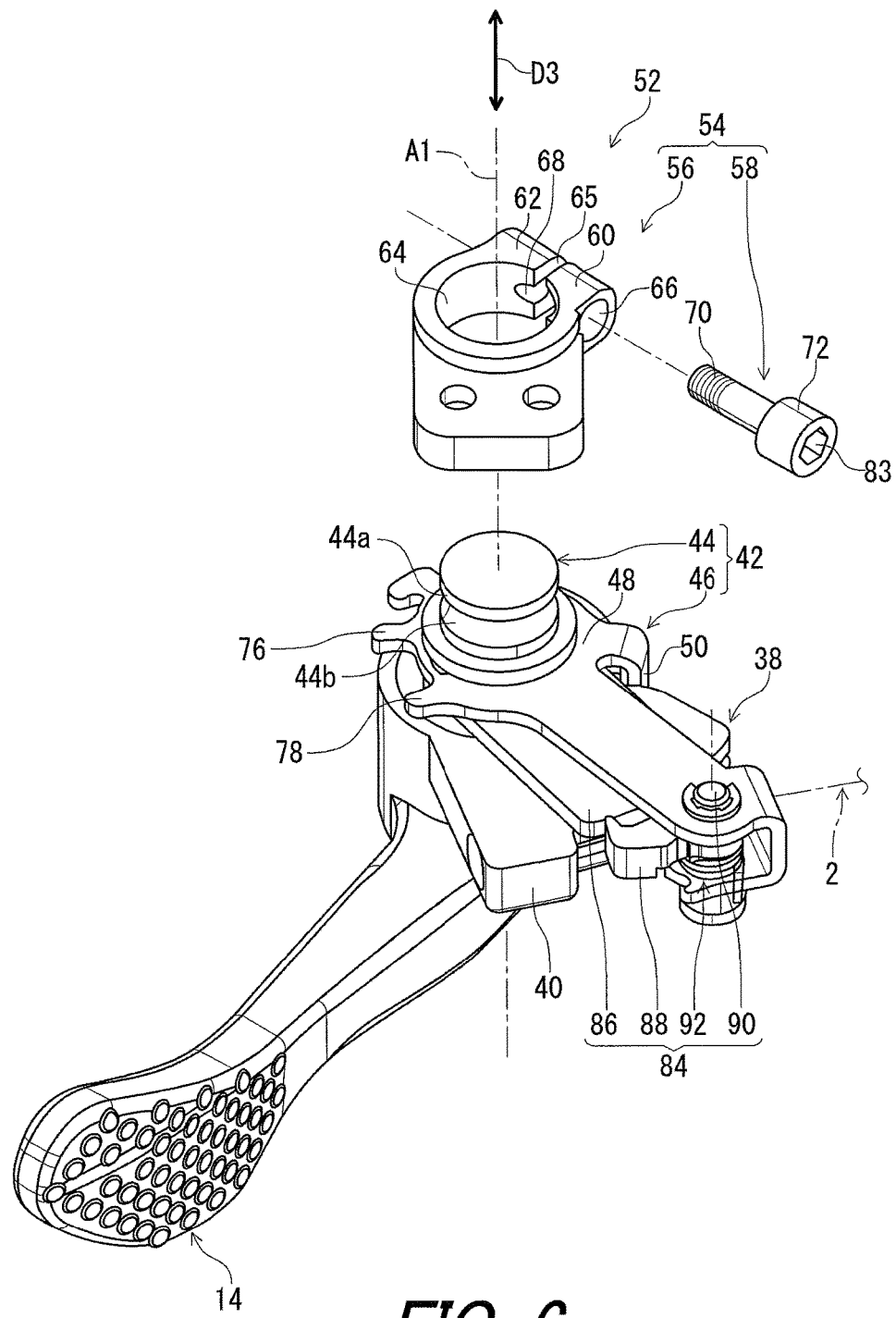
FIG. 6 is an exploded perspective view of an adjusting structure of the bicycle operating device.

As seen in FIGS. 4 and 6, the supporting structure 42 includes a pivot shaft 44 and a support member 46. The pivot shaft 44 is movably coupled to the cable control body 38 such that the cable control body 38 is pivotable relative to the pivot shaft 44 about the pivot axis A1. The support member 46 is non-rotatably coupled to the pivot shaft 44. The pivot shaft 44 defines the pivot axis A1. The cable control body 38 is pivotable relative to the pivot shaft 44 and the support member 46 about the pivot shaft 44. In this embodiment, the support member 46 is a separate member from the pivot shaft 44. The support member 46 is secured to the pivot shaft 44 via adhesive and/or other suitable securing structures. As seen in FIG. 4, the supporting structure 42 includes a lock member 47. The operating member 14 is pivotably coupled to the pivot shaft 44 via the lock member 47.

As seen in FIG. 6, the support member 46 includes a support body 48 and a positioning part 50. The support member 46 is made of a metal plate, for example. The support body 48 is secured to the pivot shaft 44 and extends radially outwardly from the pivot shaft 44. The positioning part 50 is secured to the support body 48 and is contactable with the cable control body 38. The positioning part 50 extends from the support body 48 in an axial direction D3 parallel to the pivot axis A1. As seen in FIG. 5, the cable control body 38 and the operating member 14 are positioned at the rest position P1 in a rest state where the cable control body 38 is in contact with the positioning part 50.

Figure 7:
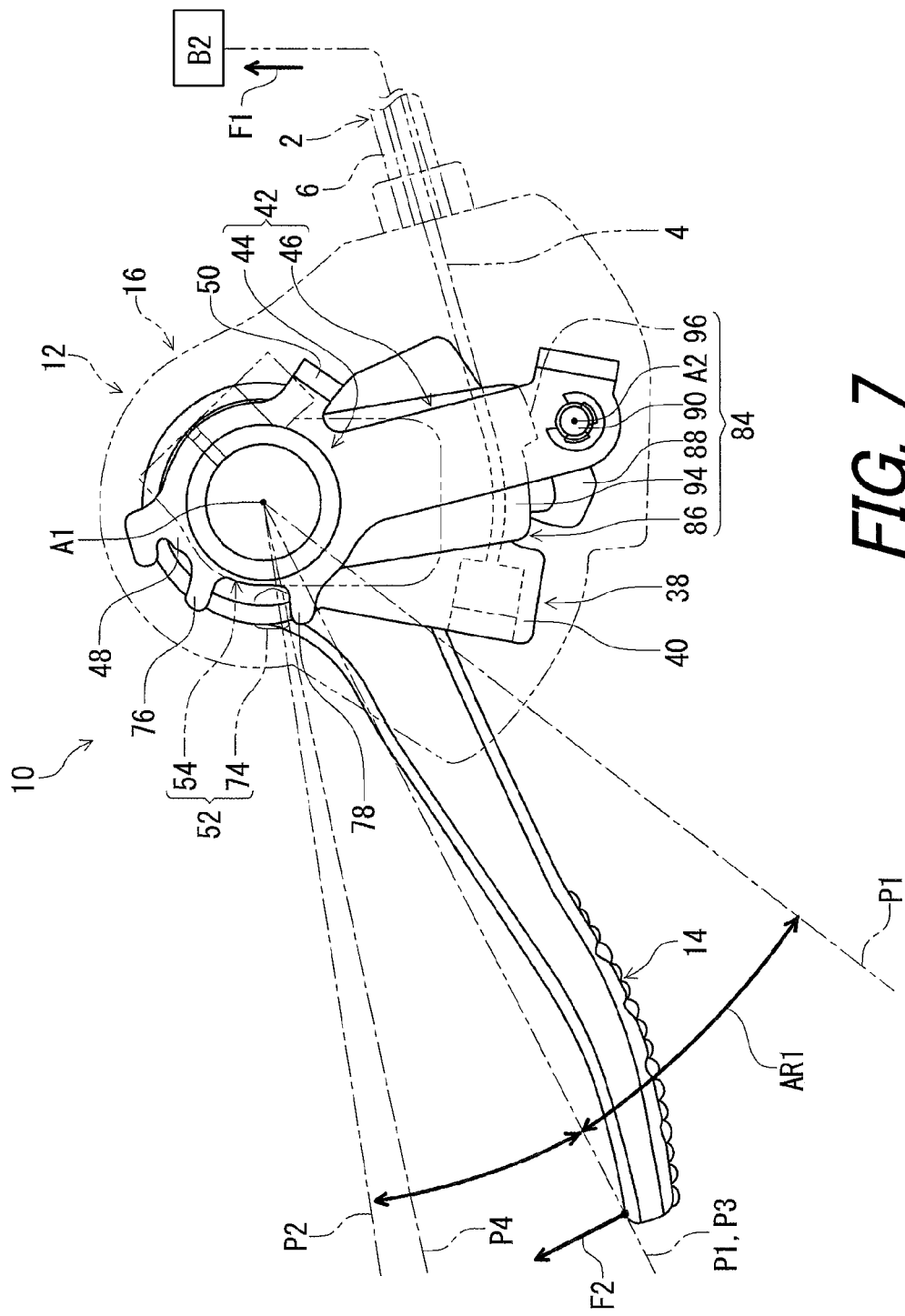
FIG. 7 is a plan view of the bicycle operating device with the base member omitted.

As seen in FIGS. 4, 5, and 7, the bicycle operating device 10 comprises an adjusting structure 52 configured to adjustably position the supporting structure 42 relative to the base member 12 such that the rest position P1 of the operating member 14 is adjusted relative to the base member 12. In this embodiment, the adjusting structure 52 is configured to adjustably position the supporting structure 42 relative to the base member 12 about (around) the pivot axis A1. The adjusting structure 52 is configured to adjustably position the supporting structure 42 relative to the base member 12 about the pivot axis A1 within an adjustable range AR1 (FIG. 7). Specifically, the adjusting structure 52 is configured to adjustably position the cable control body 38 relative to the base member 12 such that the rest position P1 of the operating member 14 is adjusted relative to the base member 12.

In this embodiment, the adjusting structure 52 is configured to adjustably position the supporting structure 42 relative to the base member 12 about the pivot axis A1 such that the rest position P1 of the operating member 14 is continuously adjusted relative to the base member 12. However, the adjusting structure 52 can be configured to adjustably position the supporting structure 42 relative to the base member 12 about the pivot axis A1 such that the rest position P1 of the operating member 14 is adjusted relative to the base member 12 in a stepwise manner.

As seen in FIGS. 5 and 7, the adjusting structure 52 is configured to position the supporting structure 42 relative to the base member 12 about the pivot axis A1 such that the cable control body 38 is movable relative to the base member 12 from the rest position P1 to the operated position P2. In this embodiment, the adjusting structure 52 is configured to position the supporting structure 42 relative to the base member 12 about the pivot axis A1 such that the cable control body 38 is pivotable relative to the base member 12 about the pivot axis A1 from the rest position P1 to the operated position P2. The cable control body 38 and the operating member 14 are pivotable relative to the base member 12 about the pivot axis A1 between the rest position P1 and the operated position P2 in a state where the adjusting structure 52 positions the supporting structure 42 at an adjusted position P3 relative to the base member 12.

As seen in FIGS. 4 and 6, the adjusting structure 52 includes a clamping structure 54 configured to adjustably position the pivot shaft 44 such that a circumferential position of the cable control body 38 is adjusted relative to the base member 12 about the pivot axis A1. The clamping structure 54 includes a clamping member 56 and a fastener 58. The clamping member 56 is configured to be attached to the base member 12 (FIG. 4).

In this embodiment, as seen in FIG. 4, the clamping member 56 is fixedly attached to the housing 16 of the base member 12 via screws 59. In this embodiment, the clamping member 56 is attached to the first housing member 20 of the housing 16. However, the clamping member 56 can be attached to the second housing member 22 or other parts of the base member 12.

Figure 8:
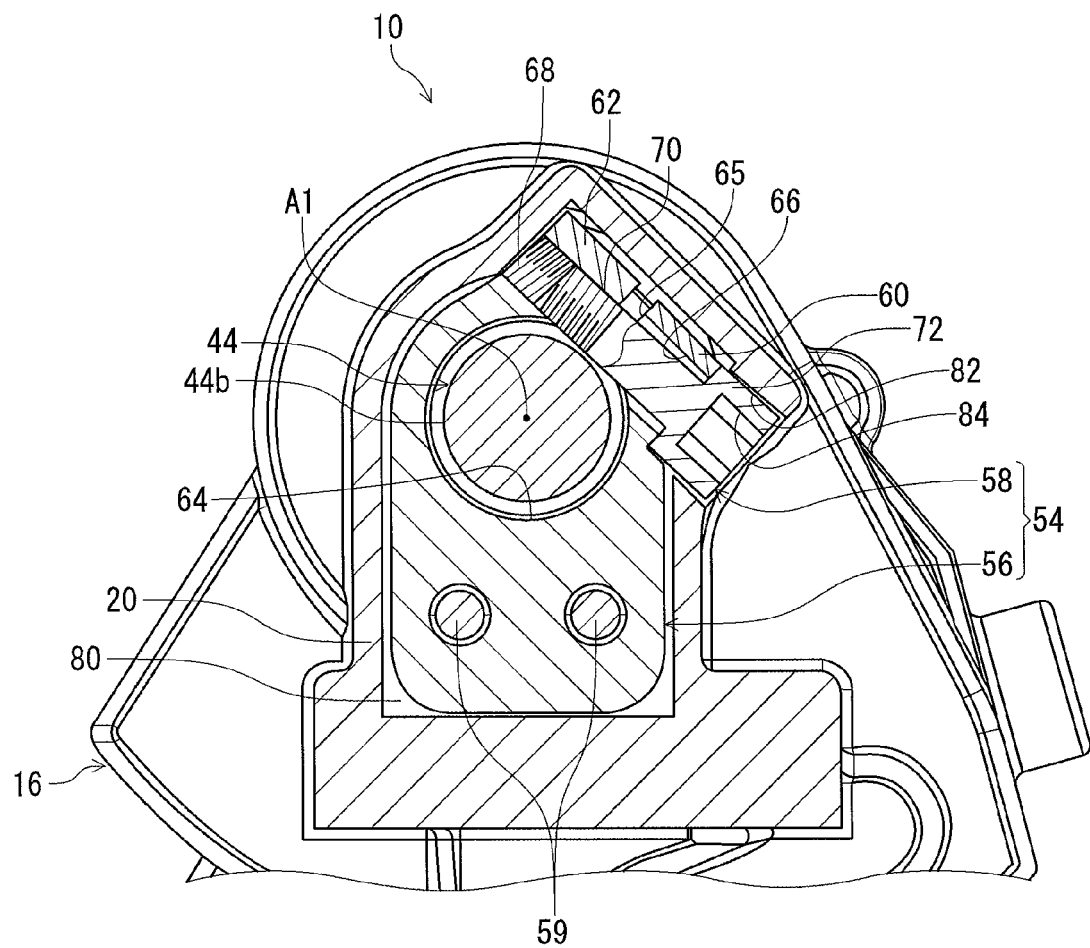
FIG. 8 is a cross-sectional view of the bicycle operating device.

As seen in FIG. 6, the pivot shaft 44 includes an outer peripheral surface 44a and an outer groove 44b provided on the outer peripheral surface 44a. The outer groove 44b extends about the pivot axis A1. The outer groove 44b has an annular shape. As seen in FIG. 8, the fastener 58 extends through the outer groove 44b to prevent the pivot shaft 44 from being removed from the clamping member 56.

The clamping member 56 is configured to be in each of an adjustable state and a securing state. In the adjustable state, the pivot shaft 44 is rotatable relative to the base member 12 about the pivot axis A1. In the securing state, the pivot shaft 44 is secured to the base member 12 via the clamping member 56. The fastener 58 is configured to change a state of the clamping member 56 between the adjustable state and the securing state.

As seen in FIGS. 6 and 7, the clamping member 56 includes a first clamping arm 60 and a second clamping arm 62. The first clamping arm 60 and the second clamping arm 62 define a clamp opening 64 in which the pivot shaft 44 is provided. The clamping member 56 includes a slit 65 provided between the first clamping arm 60 and the second clamping arm 62. At least one of the first clamping arm 60 and the second clamping arm 62 is elastically deformable to change a width of the slit 65.

The first clamping arm 60 includes a through-hole 66. The second clamping arm 62 includes a threaded hole 68. The fastener 58 extends through the through-hole 66. The fastener 58 includes external threads 70 and a head part 72. The external threads 70 are engaged with the threaded hole 68. The head part 72 is in contact with the first clamping arm 60. Tightening the fastener 58 decreases the width of the slit 65 so that the pivot shaft 44 is secured to the base member 12 via the clamping member 56 (the securing state). Loosening the fastener 58 increases the width of the slit 65 so that the pivot shaft 44 is rotatable relative to the base member 12 about the pivot axis A1 (the adjustable state).

As seen in FIGS. 4, 5, and 7, the adjusting structure 52 includes a restricting member 74 contactable with the supporting structure 42 to define the adjustable range AR1 (FIG. 7). As seen in FIG. 4, the restricting member 74 is secured to the base member 12. In this embodiment, the restricting member 74 is secured to the first housing member 20 of the housing 16. The restricting member 74 extends from the first housing member 20 in the axial direction D3.

As seen in FIGS. 5 and 7, the support member 46 includes a first contact part 76 and a second contact part 78. The first contact part 76 is contactable with the restricting member 74. The second contact part 78 is contactable with the restricting member 74. In this embodiment, the first contact part 76 extends radially outward from the support body 48. The second contact part 78 extends radially outward from the support body 48. The first contact part 76 is spaced apart from the second contact part 78 in the circumferential direction about the pivot axis A1. The restricting member 74 is provided between the first contact part 76 and the second contact part 78.

Figure 9:
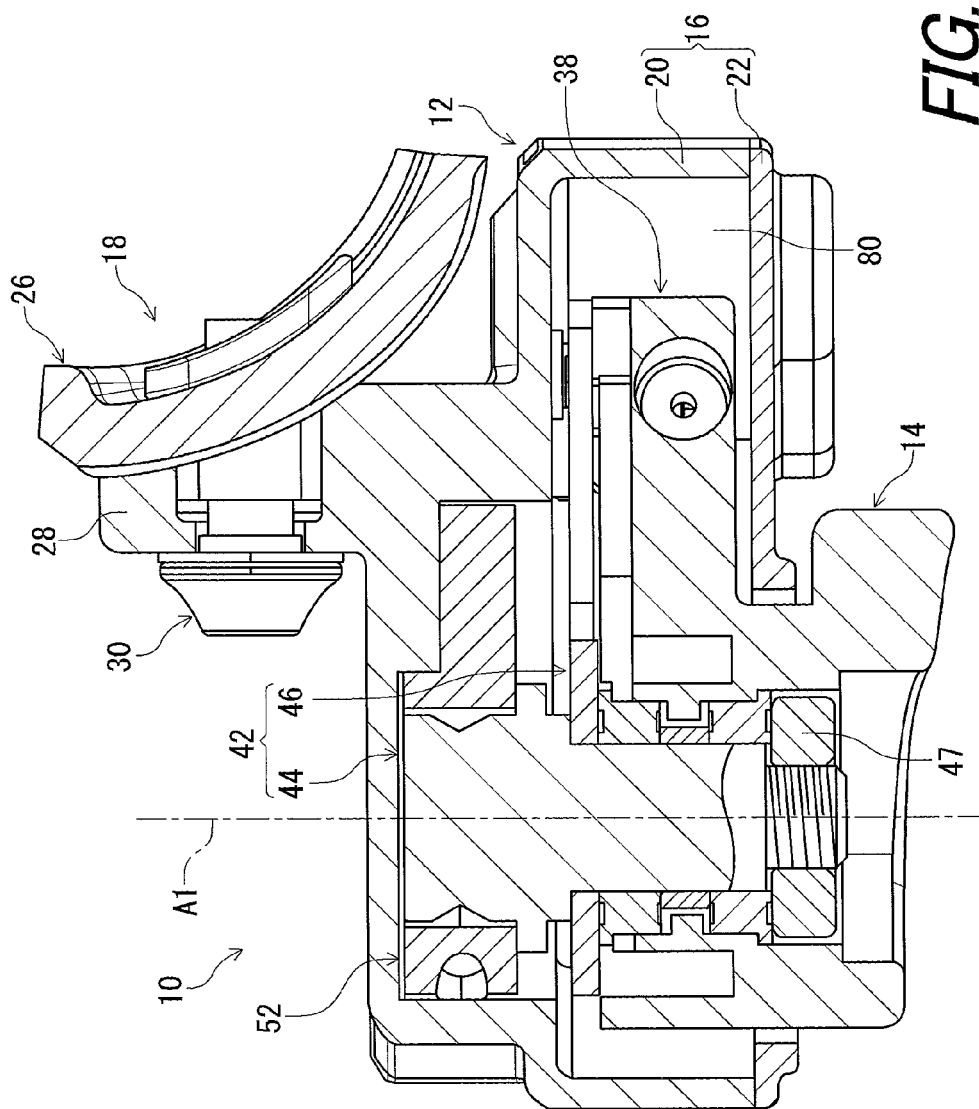
FIG. 9 is a cross-sectional view of the bicycle operating device.

As seen in FIG. 9, each of the cable control body 38 and the adjusting structure 52 is at least partly provided in the housing 16. The housing 16 include an inner space 80. Each of the cable control body 38 and the adjusting structure 52 is at least partly provided in the inner space 80. In this embodiment, the cable control body 38 and the adjusting structure 52 are entirely provided in the housing 16. However, the cable control body 38 and the adjusting structure 52 can be partly provided in the housing 16. The supporting structure 42 is at least partly provided in the housing 16. In this embodiment, the supporting structure 42 is partly provided in the housing 16. The pivot shaft 44 is partly provided in the housing 16. The support member 46 is entirely provided in the housing 16.

As seen in FIG. 8, the fastener 58 is accessible from outside of the housing 16. The housing 16 includes an access hole 82 connecting the inner space 80 to an outside space of the housing 16. The head part 72 of the fastener 58 is provided in the access hole 82. The head part 72 is exposed from the housing 16 through the access hole 82 to the outside space of the housing 16. The head part 72 includes a tool engagement hole 83 with which a tool such as a hexagon wrench is engaged. Thus, it is possible to tighten or loosen the fastener 58 from outside of the housing 16 using the tool.

As seen in FIG. 6, the bicycle operating device 10 further comprises an informing structure 84 configured to inform the user of whether the operating member 14 passes through an informing position P4 (FIGS. 5 and 7). The informing structure 84 includes an informing member 86, an informing pawl 88, a pivot pin 90, and a biasing element 92.

The informing member 86 is pivotably mounted to the supporting structure 42 about the pivot axis A1. The informing member 86 is pivotable relative to the pivot shaft 44 and the support member 46 about the pivot axis A1. The informing member 86 is coupled to the cable control body 38 to pivot together with the cable control body 38 relative to the base member 12.

The informing pawl 88 is pivotably mounted to the support member 46 about a pawl pivot axis A2. The pivot pin 90 is configured to pivotably couple the informing pawl 88 to the support member 46 about the pawl pivot axis A2. In this embodiment, the pawl pivot axis A2 is substantially parallel to the pivot axis A1. The biasing element 92 is configured to bias the informing pawl 88 to contact the informing member 86.

As seen in FIG. 5, the informing member 86 includes a base body 94 and a protruding part 96. The base body 94 extends radially outwardly from the pivot shaft 44. The protruding part 96 protrudes radially outwardly from the base body 94. The informing pawl 88 is in contact with the base body 94 and spaced apart from the protruding part 96 in a rest state where the operating member 14 is positioned at the rest position P1.

When the informing member 86 is pivoted together with the cable control body 38 relative to the base member 12 from the rest position P1, the informing pawl 88 comes into contact with the protruding part 96. When the informing member 86 is further pivoted together with the cable control body 38 relative to the base member 12, the protruding part 96 radially outwardly moves the informing pawl 88 against a biasing force of the biasing element 92. This applies a rotational resistance to the operating member 14 at the informing position P4, allowing the user to recognize that the operating member 14 passes through the informing position P4. The informing structure 84 can be omitted from the bicycle operating device 10.

With the bicycle operating device 10, it is possible to obtain the following effects.

(1) The adjusting structure 52 is configured to adjustably position the supporting structure 42 relative to the base member 12 such that the rest position P1 of the operating member 14 is adjusted relative to the base member 12. Accordingly, it is possible to adjust the rest position P1 of the operating member 14 relative to the base member 12 by using the adjusting structure 52.

(2) The cable control body 38 is configured to be non-movably coupled to the operating member 14. Accordingly, it is possible to operate the cable control body 38 via the operating member 14 even when the adjusting structure 52 is broken.

(3) The cable control body 38 is integrally provided with the operating member 14 as a single unitary member. Accordingly, it is possible to simplify the structure of the operating member 14 and the cable control body 38.

(4) The adjusting structure 52 is configured to adjustably position the supporting structure 42 relative to the base member 12 about the pivot axis A1 such that the rest position P1 of the operating member 14 is continuously adjusted relative to the base member 12. Accordingly, it is possible to easily provide the fine adjustment of the rest position P1 by using the adjusting structure 52.

(5) The adjusting structure 52 includes the restricting member 74 contactable with the supporting structure 42 to define the adjustable range AR1. Accordingly, it is possible to mechanically define the adjustable range AR1, allowing the user to recognize the adjustable range AR1.

(6) The adjusting structure 52 includes a clamping structure 54 configured to adjustably position the pivot shaft 44 such that a circumferential position of the cable control body 38 is adjusted relative to the base member 12 about the pivot axis A1. Accordingly, it is possible to adjust the rest position P1 of the operating member 14 with a simple structure including the pivot shaft 44 and the clamping structure 54.

(7) The fastener 58 is configured to change a state of the clamping member 56 between the adjustable state and the securing state. Accordingly, it is possible to easily change the state of the clamping member 56 between the adjustable state and the securing state, making it easier to adjust the rest position P1 of the operating member 14.

(8) Since the fastener 58 is accessible from outside of the housing 16, it is possible to easily adjust the rest position P1 of the operating member 14 via the fastener 58 from outside of the housing 16.

(9) Since each of the cable control body 38 and the adjusting structure 52 is at least partly provided in the housing 16, it is possible to simplify the appearance of the bicycle operating device 10.

Second Embodiment

A bicycle operating device 210 in accordance with a second embodiment will be described below referring to FIGS. 10 to 16. The bicycle operating device 210 has the same configuration as the bicycle operating device 10 except for the housing 16, the supporting structure 42 and the adjusting structure 52. Thus, elements having substantially the same function as those in the first embodiment will be numbered the same here, and will not be described and/or illustrated again in detail here for the sake of brevity.

Figure 10:
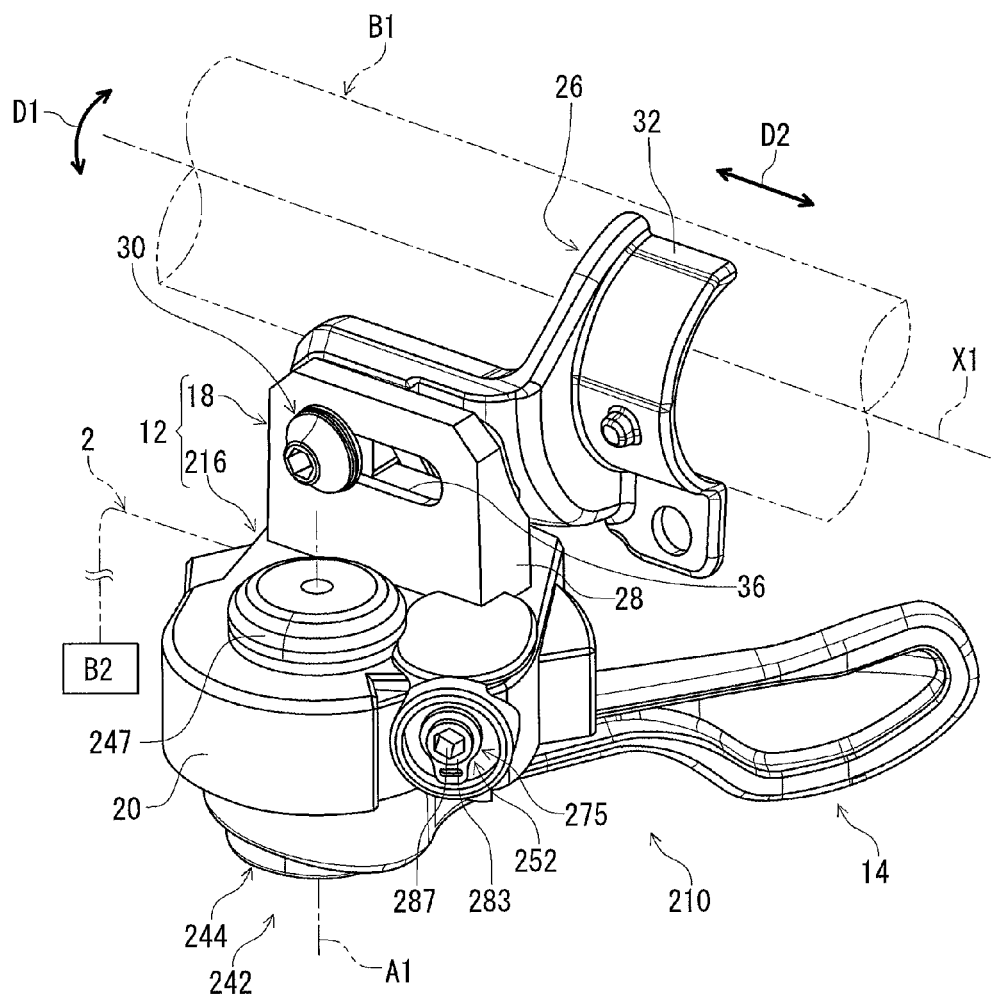
FIG. 10 is a perspective view of a bicycle operating device in accordance with a second embodiment.
Figure 11:
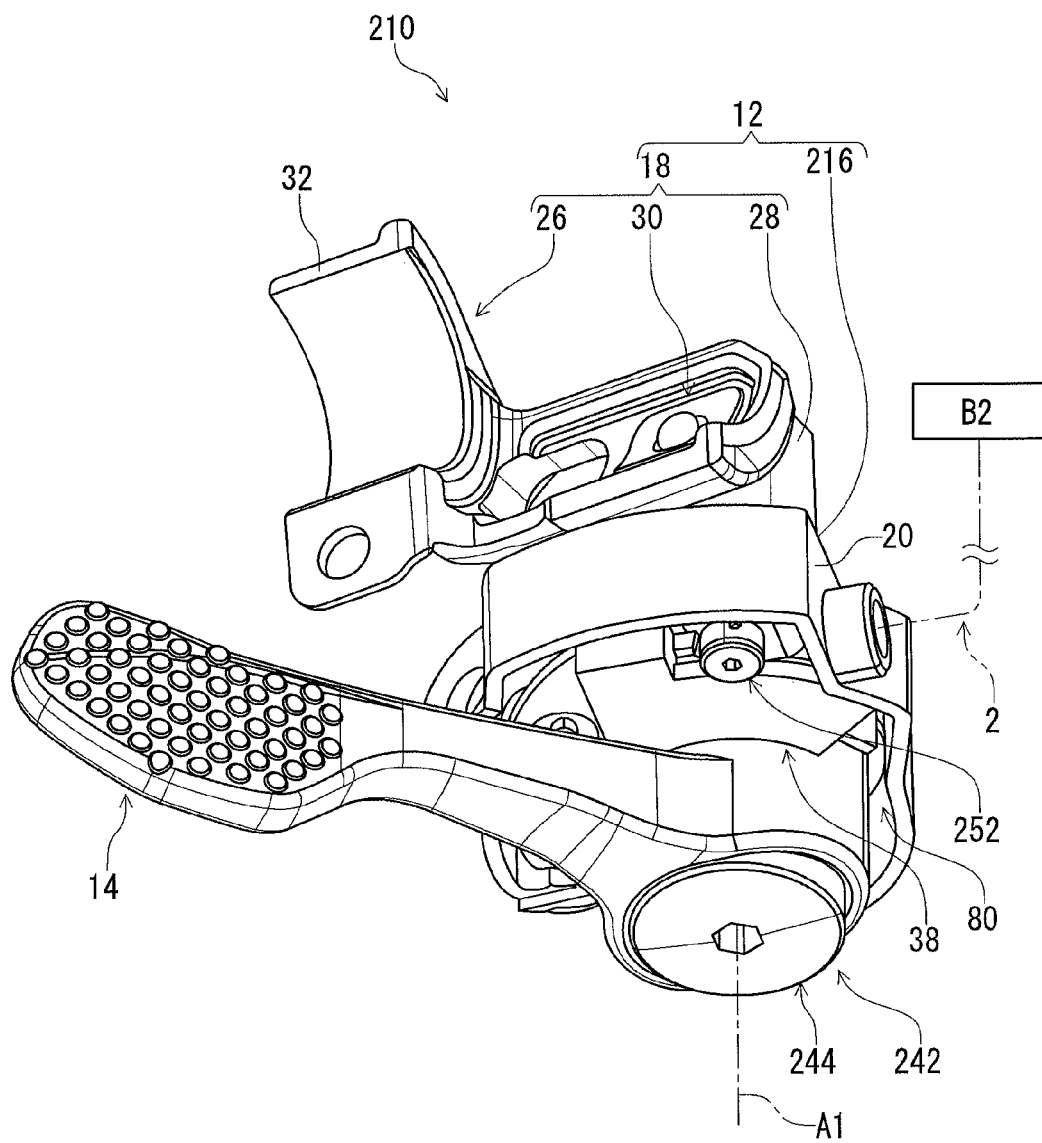
FIG. 11 is a perspective view of the bicycle operating device.
Figure 12:
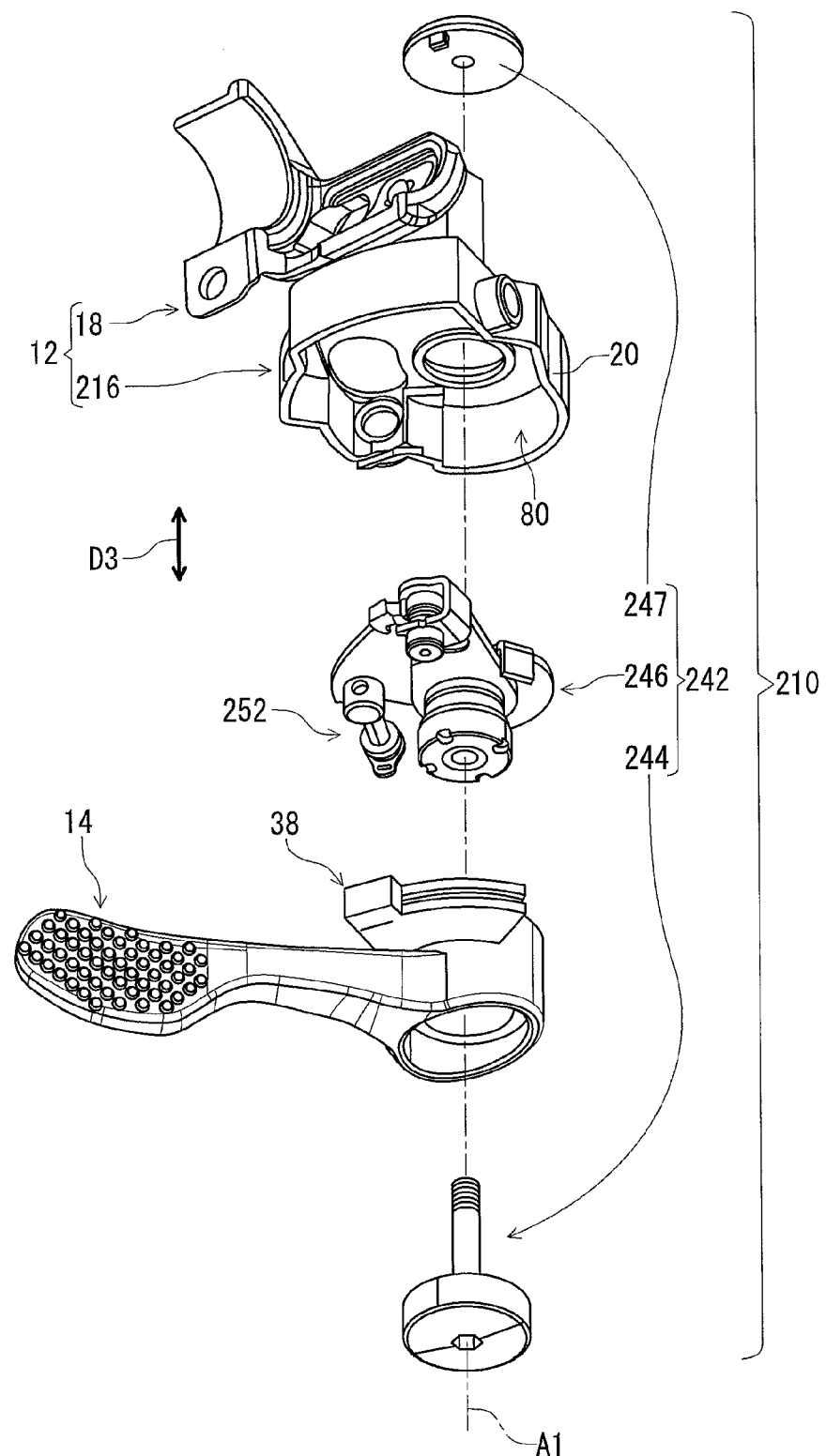
FIG. 12 is an exploded perspective view of the bicycle operating device.
Figure 13:
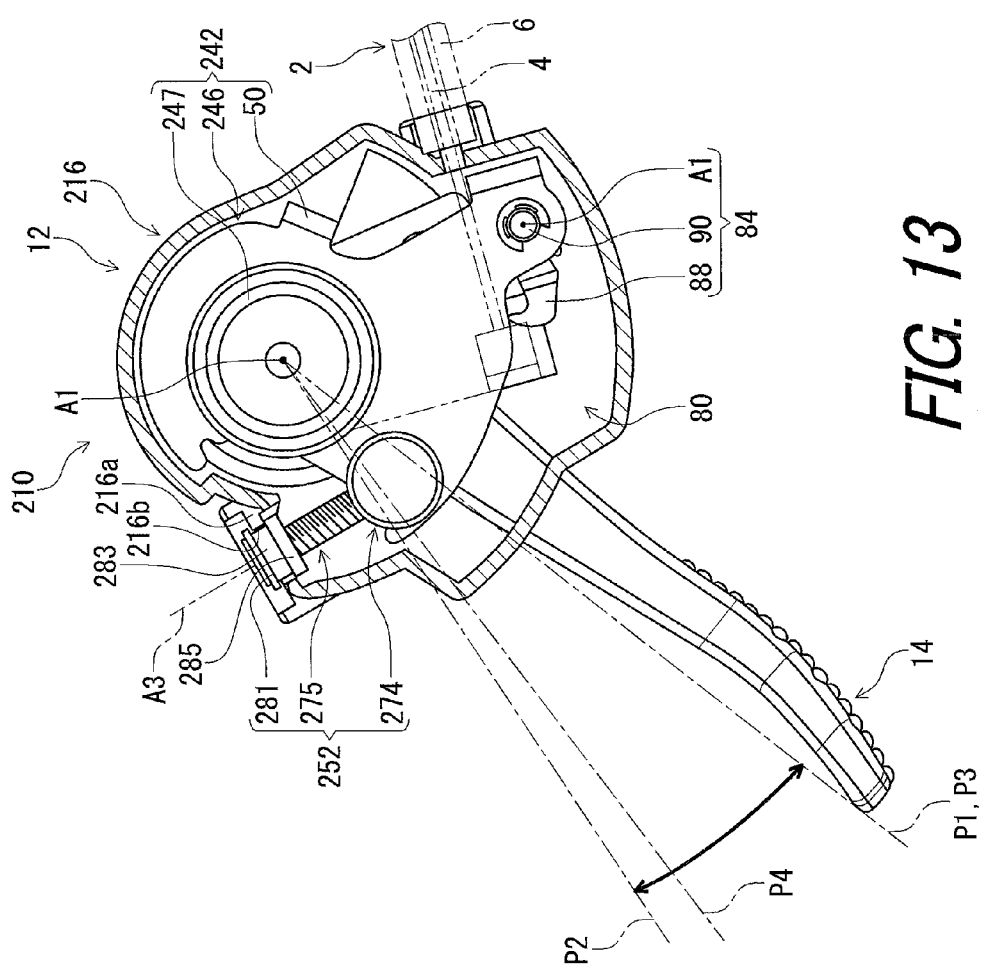
FIG. 13 is a plan view of the bicycle operating device with a base member omitted.

As seen in FIGS. 10 to 12, in the bicycle operating device 210, the base member 12 includes a housing 216. The housing 216 has substantially the same structure as that of the housing 16 in the first embodiment. However, the second housing member 22 is omitted from the housing 216. The first housing member 20 includes the inner space 80 (FIG. 13).

As seen in FIG. 12, the bicycle operating device 210 comprises a supporting structure 242. The supporting structure 242 is configured to pivotably support the cable control body 38 relative to the base member 12. As seen in FIG. 13, the supporting structure 242 is configured to position the cable control body 38 relative to the base member 12 to position the operating member 14 at the rest position P1 relative to the base member 12. The supporting structure 242 has substantially the same structure as that of the supporting structure 42 in the first embodiment.

Figure 14:
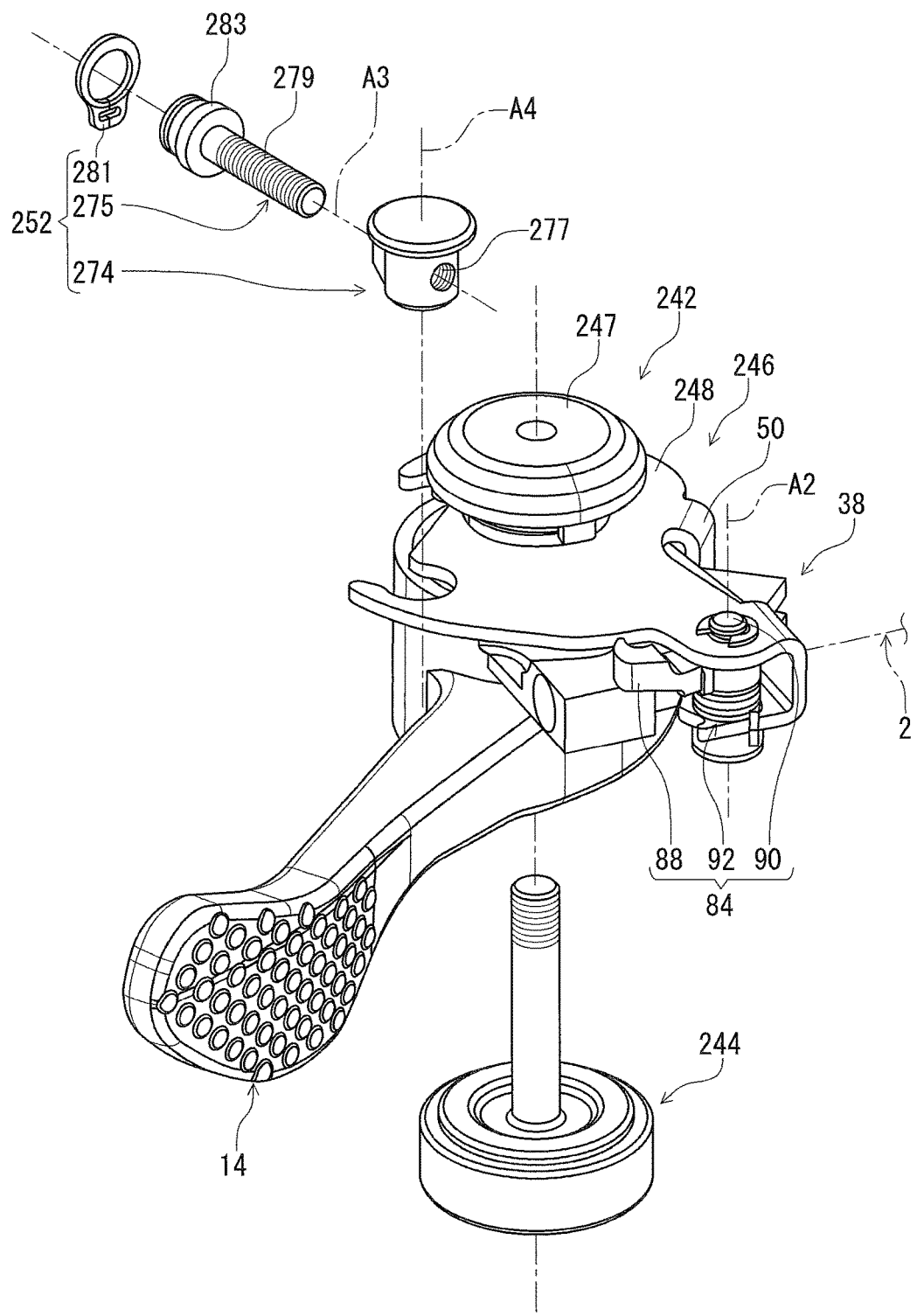
FIG. 14 is an exploded perspective view of an adjusting structure of the bicycle operating device.

As seen in FIGS. 12 and 14, the supporting structure 242 includes a pivot shaft 244 and a support member 246. The pivot shaft 244 is movably coupled to the cable control body 38 such that the cable control body 38 is pivotable relative to the pivot shaft 244 about the pivot axis A1. The support member 246 is non-rotatably coupled to the pivot shaft 244. However, the support member 246 can be rotatably coupled to the pivot shaft 244. The supporting structure 242 includes a lock member 247. The operating member 14 is pivotably coupled to the pivot shaft 244 via the lock member 247.

As seen in FIG. 14, the support member 246 includes a support body 248 and the positioning part 50. The support member 246 has substantially the same structure as that of the support member 46 in the first embodiment. The support body 248 is secured to the pivot shaft 244 and extends radially outwardly from the pivot shaft 244. However, the support body 248 can be pivotably coupled to the pivot shaft 244.

Figure 15:
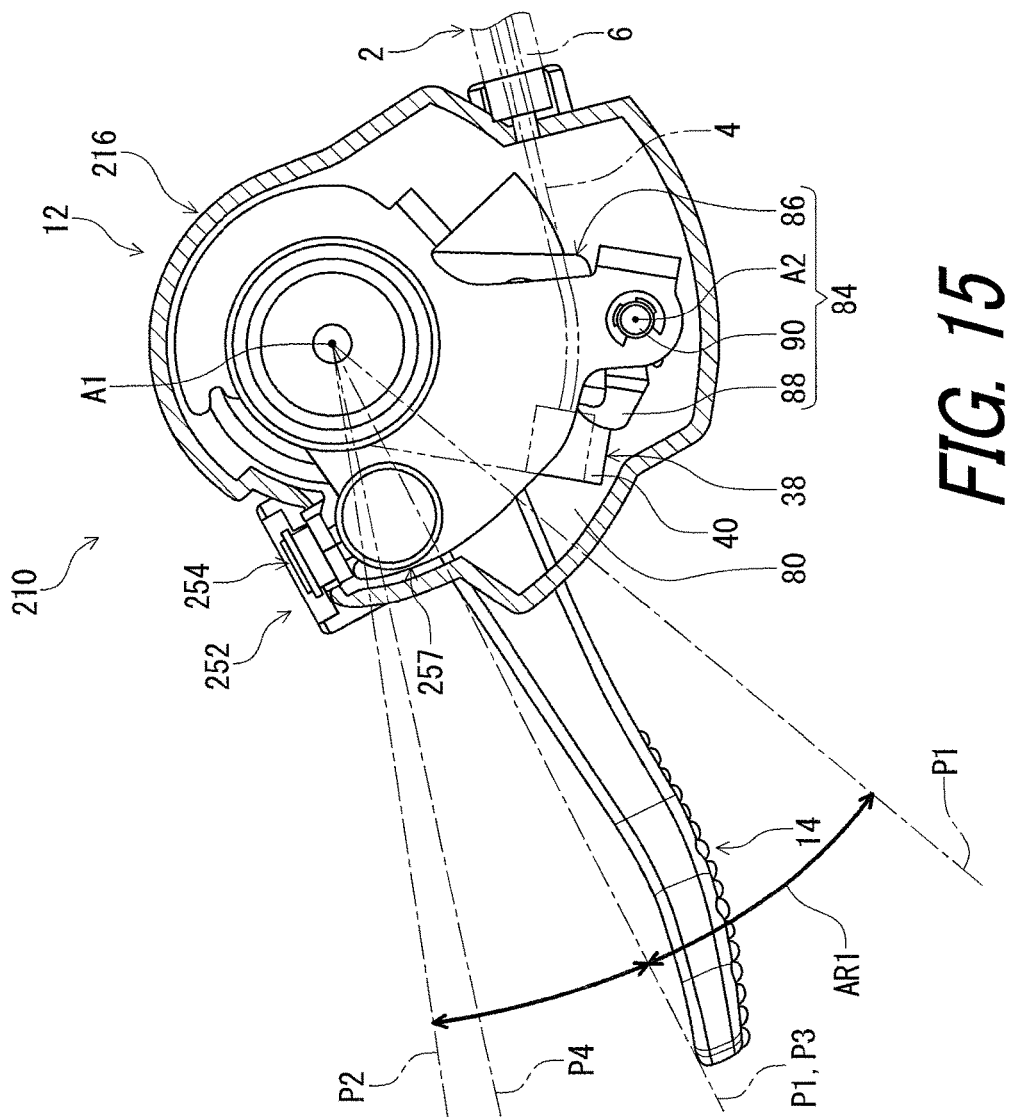
FIG. 15 is a plan view of the bicycle operating device with the base member omitted.

As seen in FIGS. 12, 13, and 15, the bicycle operating device 210 comprises an adjusting structure 252 configured to adjustably position the supporting structure 242 relative to the base member 12 such that the rest position P1 of the operating member 14 is adjusted relative to the base member 12. In this embodiment, the adjusting structure 252 is configured to adjustably position the supporting structure 242 relative to the base member 12 about the pivot axis A1. The adjusting structure 252 is configured to adjustably position the supporting structure 242 relative to the base member 12 about the pivot axis A1 within an adjustable range AR1 (FIG. 15). Specifically, the adjusting structure 252 is configured to adjustably position the cable control body 38 relative to the base member 12 such that the rest position P1 of the operating member 14 is adjusted relative to the base member 12.

In this embodiment, the adjusting structure 252 is configured to adjustably position the supporting structure 242 relative to the base member 12 about the pivot axis A1 such that the rest position P1 of the operating member 14 is continuously adjusted relative to the base member 12. However, the adjusting structure 252 can be configured to adjustably position the supporting structure 242 relative to the base member 12 about the pivot axis A1 such that the rest position P1 of the operating member 14 is adjusted relative to the base member 12 in a stepwise manner.

As seen in FIGS. 13 and 15, the adjusting structure 252 is configured to position the supporting structure 242 relative to the base member 12 about the pivot axis A1 such that the cable control body 38 is movable relative to the base member 12 from the rest position P1 to the operated position P2. The support member 246 is configured to be adjustably positioned relative to the base member 12 such that the rest position P1 of the cable control body 38 is adjusted relative to the base member 12 within the adjustable range AR1. In this embodiment, the adjusting structure 252 is configured to adjustably position the support member 246 relative to the base member 12 such that the rest position P1 of the cable control body 38 is adjusted relative to the base member 12.

The adjusting structure 252 is configured to position the supporting structure 242 relative to the base member 12 about the pivot axis A1 such that the cable control body 38 is pivotable relative to the base member 12 about the pivot axis A1 from the rest position P1 to the operated position P2. The cable control body 38 and the operating member 14 are pivotable relative to the base member 12 about the pivot axis A1 between the rest position P1 and the operated position P2 in a state where the adjusting structure 252 positions the supporting structure 242 at an adjusted position P3 relative to the base member 12.

As seen in FIG. 14, the adjusting structure 252 includes a restricting member 274 and an adjusting member 275. The restricting member 274 is configured to be coupled to the support member 246. The restricting member 274 includes a threaded hole 277. The adjusting member 275 includes a thread bolt 279 engaged with the threaded hole 277.

The adjusting member 275 is configured to be rotatably mounted to the base member 12 about a center axis A3. The threaded hole 277 and the thread bolt 279 are configured to convert a rotation of the adjusting member 275 to a pivotal movement of the support member 246 relative to the base member 12 about the pivot axis A1.

The base member 12 is configured to restrict an axial movement of the adjusting member 275 along the center axis A3 relative to the base member 12. In this embodiment, the adjusting structure 252 includes a stopper 281 attached to the adjusting member 275. The adjusting member 275 includes a head portion 283. The stopper 281 is attached to the head portion 283.

As seen in FIG. 13, the housing 216 includes a holding part 216a. The holding part 216a includes an opening 216b. The head portion 283 is provided in the opening 216b. The adjusting member 275 includes a protruding portion 285 protruding radially outwardly from the head portion 283. The protruding portion 285 is provided in the housing 216. The stopper 281 is provided outside the housing 216. The holding part 216a is provided between the protruding portion 285 and the stopper 281.

As seen in FIG. 15, each of the cable control body 38 and the adjusting structure 252 are at least partly provided in the housing 216. The adjusting member 275 is accessible from outside of the housing 216. As seen in FIG. 10, the head portion 283 of the adjusting member 275 is exposed from the housing 216 through the opening 216b to the outside space of the housing 216. The head portion 283 includes a tool engagement hole 287 with which a tool such as a hexagon wrench is engaged. Thus, it is possible to rotate the adjusting member 275 from outside of the housing 216 using the tool.

Figure 16:
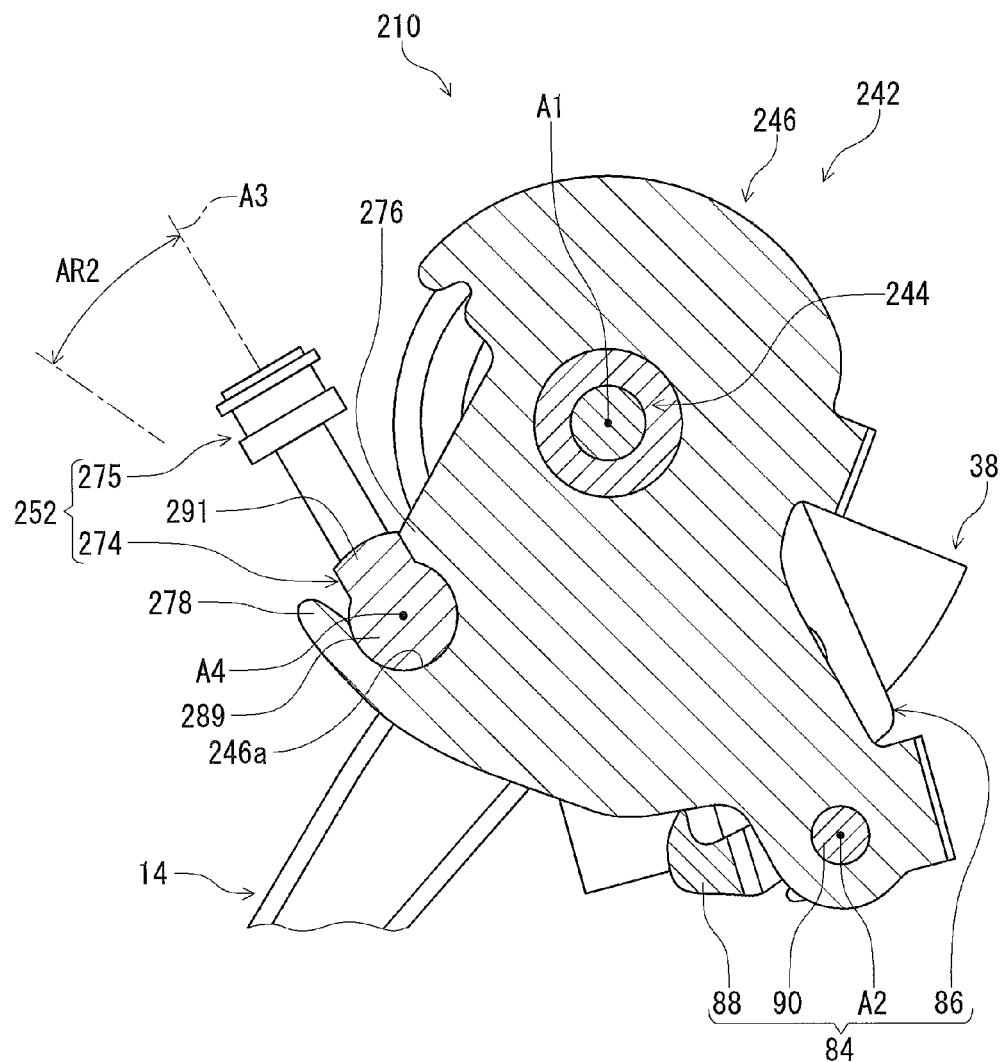
FIG. 16 is a cross-sectional view of the bicycle operating device.

As seen in FIG. 16, the restricting member 274 is pivotable relative to the support member 246 about an additional pivot axis A4. The restricting member 274 is pivotable relative to the support member 246 about the additional pivot axis A4 within a pivotable range AR2 to define the adjustable range AR1 (FIG. 15). In this embodiment, the restricting member 274 includes a pivot body 289. The support member 246 includes a support opening 246a. The pivot body 289 is pivotably provided in the support opening 246a about the additional pivot axis A4.

The support member 246 includes a first contact part 276 and a second contact part 278. The first contact part 276 is contactable with the restricting member 274. The second contact part 278 is contactable with the restricting member 274. In this embodiment, the first contact part 276 is spaced apart from the second contact part 278. The restricting member 274 is provided between the first contact part 276 and the second contact part 278. In this embodiment, the restricting member 274 includes a contact portion 291 protruding from the pivot body 289. The first contact part 276 is contactable with the contact portion 291. The second contact part 278 is contactable with the contact portion 291. The contact portion 291 is provided between the first contact part 276 and the second contact part 278.

The restricting member 74, the first contact part 76, and the second contact part 78 of the first embodiment can be applied to the adjusting structure 252 to restrict a pivotal movement of the supporting structure 242 within the adjustable range AR1 instead of the restricting member 274.

With the bicycle operating device 210, it is possible to obtain the following effects in addition to and/or instead of the effect obtained by the bicycle operating device 10 in accordance with the first embodiment.

(1) The adjusting structure 252 is configured to adjustably position the supporting structure 242 relative to the base member 12 such that the rest position P1 of the operating member 14 is adjusted relative to the base member 12. Accordingly, it is possible to adjust the rest position P1 of the operating member 14 relative to the base member 12 by using the adjusting structure 252.

(2) The threaded hole 277 and the thread bolt 279 are configured to convert the rotation of the adjusting member 275 to the pivotal movement of the support member 46 relative to the base member 12 about the pivot axis A1. Accordingly, it is possible to easily adjust the rest position P1 of the operating member 14 by using the restricting member 274 and the adjusting member 275.

(3) Since the adjusting member 275 is accessible from outside of the housing 216, it is possible to easily adjust the rest position P1 of the operating member 14 via the adjusting member 275 from outside of the housing 216.

(4) The restricting member 274 is pivotable relative to the support member 246 about the additional pivot axis A4 within the pivotable range AR2 to define the adjustable range AR1. Accordingly, it is possible to mechanically define the adjustable range AR1 via the restricting member 274 and the support member 246, allowing the user to recognize the adjustable range AR1.

Third Embodiment

A bicycle operating device 310 in accordance with a third embodiment will be described below referring to FIGS. 17 and 18. The bicycle operating device 310 has the same configuration as the bicycle operating device 10 except for an additional operating unit. Thus, elements having substantially the same function as those in the above embodiments will be numbered the same here, and will not be described and/or illustrated again in detail here for the sake of brevity.

Figure 17:
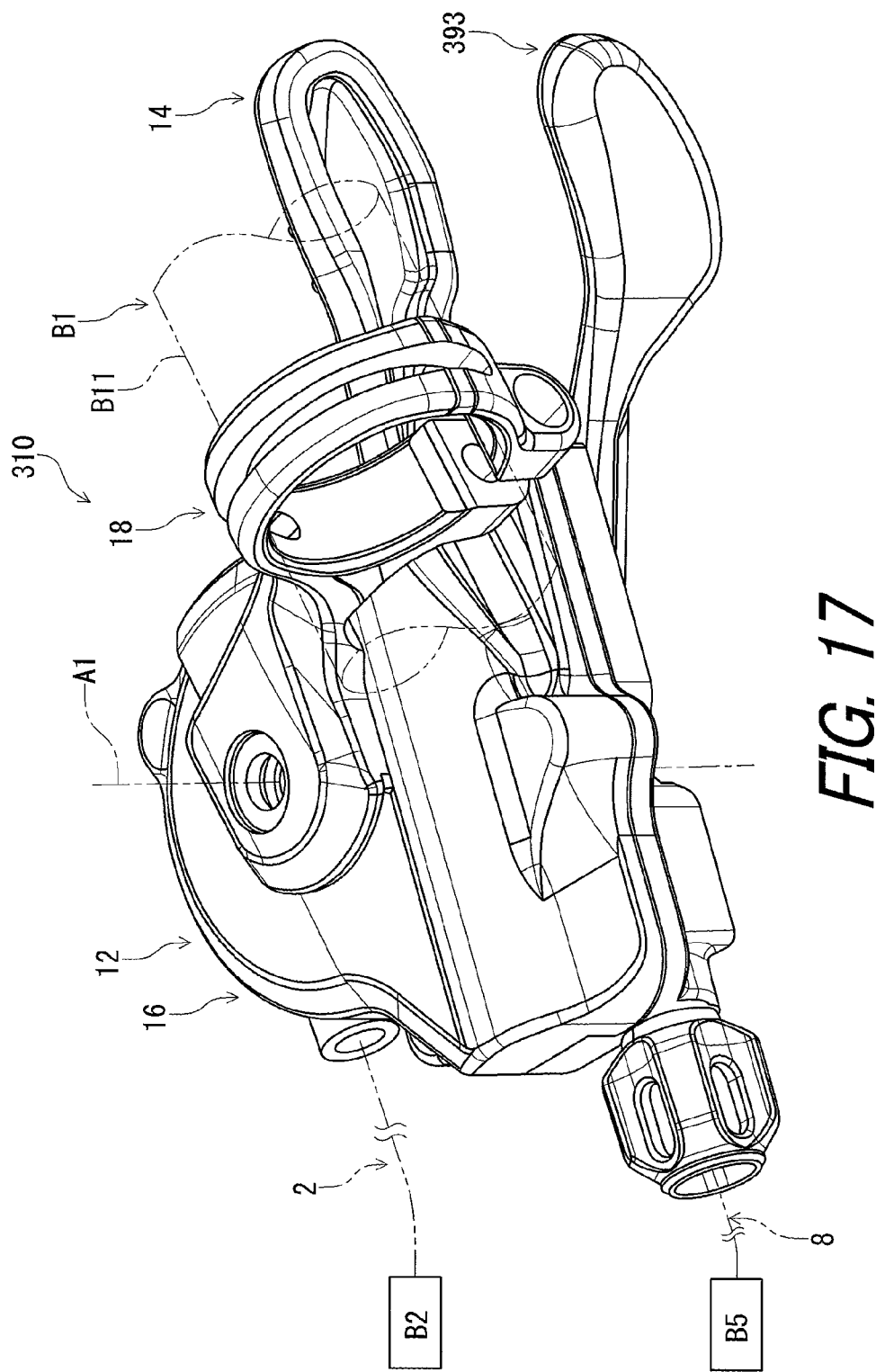
FIG. 17 is a perspective view of a bicycle operating device in accordance with a third embodiment.
Figure 18:
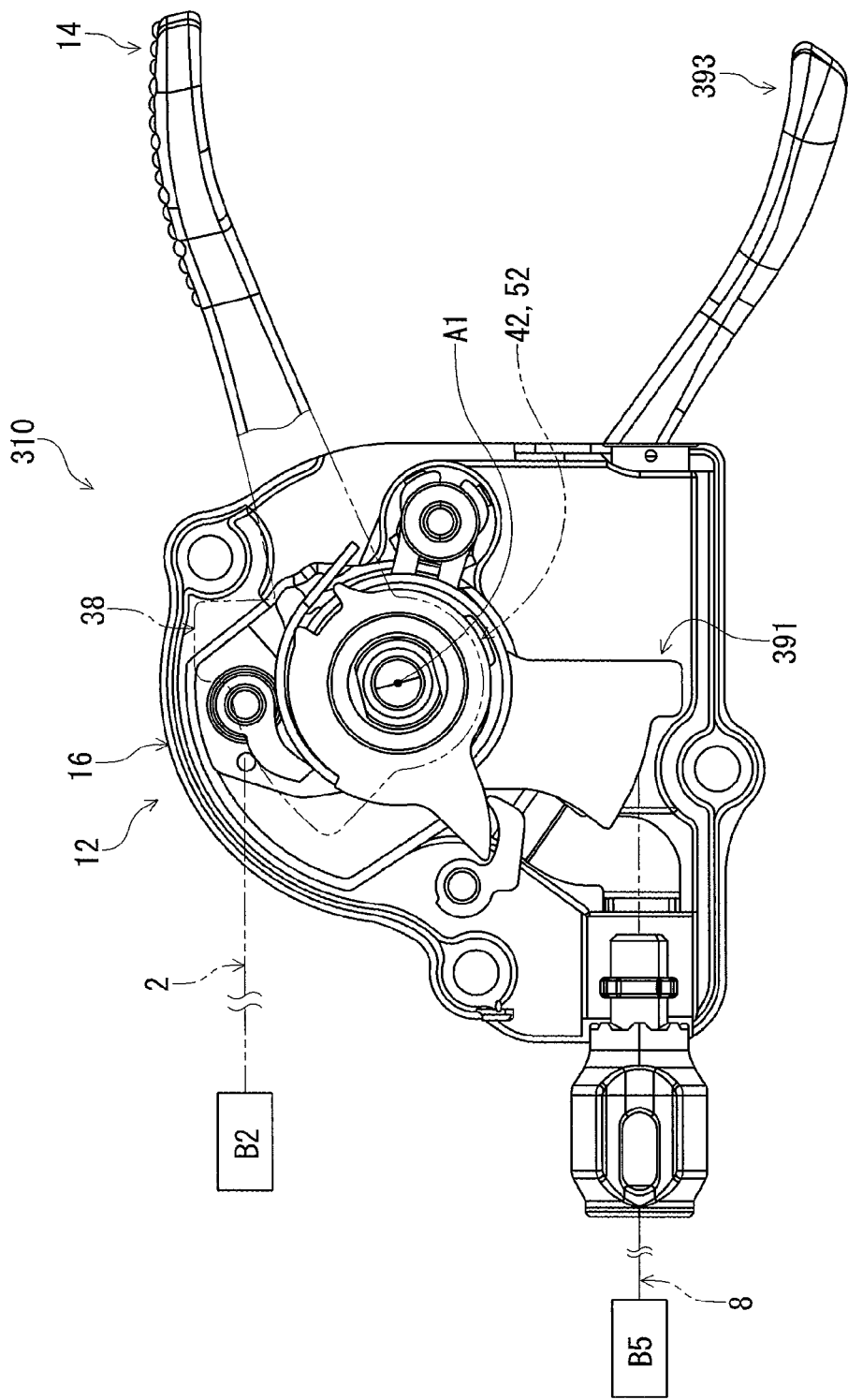
FIG. 18 is a plan view of the bicycle operating device with the base member omitted.

As seen in FIGS. 17 and 18, the bicycle operating device 310 has substantially the same structure as that of the bicycle operating device 10 in the first embodiment. In addition to the bicycle component B2, however, the bicycle operating device 310 is configured to operate an additional bicycle component B5 configured to be operated via an additional control cable 8 such as a Bowden cable. Further, the bicycle operating device 310 can be an electrical switch which electrically controls the additional bicycle component B5, or a hydraulic device which hydraulically controls the additional bicycle component B5.

In this embodiment, the bicycle operating device 310 has substantially the same structure as that of the bicycle operating device 10 in the first embodiment. However, the bicycle operating device 310 can have substantially the same structure as that of the bicycle operating device 210 in the second embodiment.

The bicycle operating device 310 further comprises an additional cable control body 391 and an additional operating member 393. The additional cable control body 391 is separately provided from the cable control body 38. The additional cable control body 391 is movable relative to the base member 12 to control the additional control cable 8 separately provided from the control cable 2.

The additional bicycle component B5 is different from the bicycle component B2. The additional bicycle component B5 can be a cable-operated device. Examples of the additional bicycle component B5 include the adjustable seatpost assembly, the bicycle transmission, the suspension, and the intermediate take-up device.

As seen in FIG. 18, the additional operating member 393 is movable relative to the base member 12 to move the additional cable control body 391 relative to the base member 12. The adjusting structure 52 is configured to adjustably position the supporting structure 42 relative to the base member 12 without changing the position of the additional cable control body 391 and the additional operating member 393 relative to the base member 12.

The bicycle operating device 310 includes only the operating member 14 as a single operating member configured to move the cable control body 38. However, the bicycle operating device 310 can include another operating member configured to move the cable control body 38 in addition to the operating member 14.

With the bicycle operating device 310, it is possible to obtain the following effect in addition to and/or instead of the effect obtained by the bicycle operating device 10 in accordance with the first embodiment.

(1) The adjusting structure 52 is configured to adjustably position the supporting structure 42 relative to the base member 12 without changing the position of the additional cable control body 391 and the additional operating member 393 relative to the base member 12. Accordingly, it is possible to operate the additional bicycle component B5 by using the additional cable control body 391 and the additional operating member 393 in addition to the bicycle component B2.

It will be apparent to those skilled in the bicycle field from the present disclosure that the structures of the above embodiments can be at least partly combined with each other.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and "element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:
1. A bicycle operating device comprising:
 a base member configured to be mounted to a bicycle body;
 a cable control body pivotably mounted to the base member about a pivot axis to control a control cable;

an operating member movably mounted to the base member from a rest position to an operated position to move the cable control body;

a supporting structure to pivotably support the cable control body relative to the base member, the supporting structure being provided to the base member so as to at least partly intersect with the pivot axis; and an adjusting structure to adjustably position the supporting structure relative to the base member about the pivot axis such that the rest position of the operating member is adjusted relative to the base member, wherein the pivot axis about which the cable control body is pivotably mounted to the base member is provided at a stationary location with respect to the base member regardless of adjustment of the rest position of the operating member relative to the base member, and the cable control body and the supporting structure are pivotable with respect to each other.

2. The bicycle operating device according to claim 1, wherein the cable control body is non-movably coupled to the operating member.

3. The bicycle operating device according to claim 1, wherein the adjusting structure adjustably positions the supporting structure relative to the base member about the pivot axis such that the rest position of the operating member is continuously adjusted relative to the base member.

4. The bicycle operating device according to claim 1, wherein the cable control body is pivotable together with the operating member relative to the base member about the pivot axis from the rest position to the operated position, and the adjusting structure positions the supporting structure relative to the base member about the pivot axis such that the cable control body is movable relative to the base member from the rest position to the operated position.

5. The bicycle operating device according to claim 1, wherein the adjusting structure adjustably positions the supporting structure relative to the base member about the pivot axis within an adjustable range, and the adjusting structure includes a restricting member contactable with the supporting structure to define the adjustable range.

6. The bicycle operating device according to claim 5, wherein the supporting structure includes
a pivot shaft movably coupled to the cable control body such that the cable control body is pivotable relative to the pivot shaft about the pivot axis, and
a support member non-rotatably coupled to the pivot shaft, and the support member includes
a first contact part contactable with the restricting member, and
a second contact part contactable with the restricting member.

7. The bicycle operating device according to claim 5, wherein the restricting member is secured to the base member.

8. The bicycle operating device according to claim 4, wherein the supporting structure includes a pivot shaft movably coupled to the cable control body such that the cable control body is pivotable relative to the pivot shaft about the pivot axis, and the adjusting structure includes a clamping structure to adjustably position the pivot shaft such that a circumferential position of the cable control body is adjusted relative to the base member about the pivot axis.

9. The bicycle operating device according to claim 8, wherein the clamping structure includes
a clamping member attached to the base member and having each of
an adjustable state in which the pivot shaft is rotatable relative to the base member about the pivot axis, and
a securing state in which the pivot shaft is secured to the base member via the clamping member, and
a fastener to change a state of the clamping member between the adjustable state and the securing state.

10. The bicycle operating device according to claim 9, wherein the base member includes a housing in which each of the cable control body and the adjusting structure is at least partly provided, and the fastener is accessible from outside of the housing.

11. The bicycle operating device according to claim 9, wherein the pivot shaft includes an outer peripheral surface and an outer groove provided on the outer peripheral surface, the outer groove extending about the pivot axis, and the fastener extends through the outer groove to prevent the pivot shaft from being removed from the clamping member.

12. The bicycle operating device according to claim 4, wherein the supporting structure includes
a pivot shaft movably coupled to the cable control body such that the cable control body is pivotable relative to the pivot shaft about the pivot axis, and
a support member non-rotatably coupled to the pivot shaft, and the adjusting structure adjustably positions the support member relative to the base member such that the rest position of the cable control body is adjusted relative to the base member.

13. The bicycle operating device according to claim 12, wherein the adjusting structure includes
a restricting member coupled to the support member, the restricting member including a threaded hole, and
an adjusting member including a thread bolt engaged with the threaded hole, the adjusting member being rotatably mounted to the base member about a center axis, and the threaded hole and the thread bolt convert a rotation of the adjusting member to a pivotal movement of the support member relative to the base member about the pivot axis.

14. The bicycle operating device according to claim 13, wherein the base member restricts an axial movement of the adjusting member along the center axis relative to the base member.

15. The bicycle operating device according to claim 13, wherein the base member includes a housing in which each of the cable control body and the adjusting structure is at least partly provided, and the adjusting member is accessible from outside of the housing.

16. The bicycle operating device according to claim 13, wherein the restricting member is pivotable relative to the support member about an additional pivot axis.

17. The bicycle operating device according to claim 16, wherein the support member is adjustably positioned relative to the base member such that the rest position of the cable control body is adjusted relative to the base member within an adjustable range, and the restricting member is pivotable relative to the support member about the additional pivot axis within a pivotable range to define the adjustable range.

18. The bicycle operating device according to claim 1, further comprising:

an additional cable control body separately provided from the cable control body, the additional cable control body being movable relative to the base member to control an additional control cable separately provided from the control cable; and an additional operating member movable relative to the base member to move the additional cable control body relative to the base member, wherein the adjusting structure adjustably positions the supporting structure relative to the base member without changing the position of the additional cable control body and the additional operating member relative to the base member.

19. The bicycle operating device according to claim 1, wherein the supporting structure is movably mounted to the base member, and the supporting structure positions the cable control body relative to the base member to position the operating member at the rest position relative to the base member.

20. The bicycle operating device according to claim 19, wherein the supporting structure is pivotably mounted to the base member about the pivot axis.

21. The bicycle operating device according to claim 19, wherein the base member includes a housing in which the supporting structure is at least partly provided, and the supporting structure is movably mounted to the housing.

22. A bicycle operating device comprising:

a base member configured to be mounted to a bicycle body, the base member including a housing;

a cable control body pivotably mounted to the base member about a pivot axis to control a control cable;

an operating member movably mounted to the base member from a rest position to an operated position to move the cable control body; and an adjusting structure to adjustably position the cable control body relative to the base member such that the rest position of the operating member is adjusted relative to the base member, the cable control body being entirely provided in the housing and the adjusting structure being at least partly provided in the housing.

23. The bicycle operating device according to claim 22, wherein the adjusting structure adjustably positions the cable control body relative to the base member about the pivot axis such that the rest position of the operating member is adjusted relative to the base member.

24. The bicycle operating device according to claim 22, wherein the pivot axis about which the cable control body is pivotably mounted to the base member is provided at a stationary location with respect to the base member regardless of adjustment of the rest position of the operating member relative to the base member.

25. The bicycle operating device according to claim 22, wherein wherein the adjusting structure is entirely provided in the housing.

26. A bicycle operating device comprising:

a base member configured to be mounted to a bicycle body;

a cable control body pivotably mounted to the base member about a pivot axis to control a control cable;

an operating member movably mounted to the base member from a rest position to an operated position to move the cable control body;

a supporting structure to pivotably support the cable control body relative to the base member, the supporting structure being provided to the base member so as to at least partly intersect with the pivot axis; and an adjusting structure to adjustably position the supporting structure relative to the base member about the pivot axis such that the rest position of the operating member is adjusted relative to the base member, wherein the adjusting structure includes a clamping structure that includes a clamping member having a clamp opening with a center axis coaxial with the pivot axis.

27. The bicycle operating device according to claim 26, wherein the clamping member includes a first clamping arm and a second clamping arm that define the clamp opening, and a slit is provided between the first clamping arm and the second clamping arm.

28. A bicycle operating device comprising:

a base member configured to be mounted to a bicycle body;

a cable control body pivotably mounted to the base member about a pivot axis to control a control cable;

an operating member movably mounted to the base member from a rest position to an operated position to move the cable control body;

a supporting structure to pivotably support the cable control body relative to the base member, the supporting structure being provided to the base member so as to at least partly intersect with the pivot axis; and an adjusting structure to adjustably position the supporting structure relative to the base member such that the rest position of the operating member is adjusted (only) about the pivot axis relative to the base member, wherein the cable control body is integrally provided with the operating member as a single unitary member, and the pivot axis about which the cable control body is pivotably mounted to the base member is provided at a stationary location with respect to the base member regardless of adjustment of the rest position of the operating member relative to the base member.

29. The bicycle operating device according to claim 28, wherein the cable control body and the supporting structure are pivotable with respect to each other.

30. The bicycle operating device according to claim 1, wherein the adjusting structure adjustably positions the supporting structure relative to the base member about the pivot axis such that the rest position of the operating member is adjusted about the pivot axis relative to the base member.

\* \* \* \* \*